(12) United States Patent
Carver et al.

(10) Patent No.: US 12,033,447 B2
(45) Date of Patent: Jul. 9, 2024

(54) DYNAMIC DRIVER AND VEHICLE ANALYTICS BASED ON VEHICLE TRACKING AND DRIVING STATISTICS

(71) Applicant: Speedgauge, Inc., San Francisco, CA (US)

(72) Inventors: Christopher J. Carver, Bainbridge Island, WA (US); Jonathan Hubbard, San Francisco, CA (US)

(73) Assignee: SPEEDGAUGE, INC., San Francisco, CA (US)

( * ) Notice: Subject to any disclaimer, the term of this patent is extended or adjusted under 35 U.S.C. 154(b) by 0 days.

(21) Appl. No.: 18/220,329

(22) Filed: Jul. 11, 2023

(65) Prior Publication Data

US 2023/0351820 A1    Nov. 2, 2023

Related U.S. Application Data

(63) Continuation of application No. 16/797,293, filed on Feb. 21, 2020, now Pat. No. 11,699,309.

(60) Provisional application No. 62/813,567, filed on Mar. 4, 2019.

(51) Int. Cl.
*G07C 5/08* (2006.01)
*G06Q 40/08* (2012.01)
*G07C 5/02* (2006.01)

(52) U.S. Cl.
CPC ........... *G07C 5/0816* (2013.01); *G06Q 40/08* (2013.01); *G07C 5/02* (2013.01)

(58) Field of Classification Search
CPC ......... G07C 5/0816; G07C 5/02; G06Q 40/08
USPC ......................................................... 701/33.4
See application file for complete search history.

(56) References Cited

U.S. PATENT DOCUMENTS

| | | | |
|---|---|---|---|
| 6,226,591 B1 | 5/2001 | Okumura et al. | |
| 8,751,563 B1 * | 6/2014 | Warden | G06F 16/24 709/224 |
| 10,029,685 B1 | 7/2018 | Hubbard et al. | |
| RE47,986 E | 5/2020 | Hubbard et al. | |
| 10,697,784 B1 * | 6/2020 | Li | H04W 4/027 |
| 10,803,525 B1 | 10/2020 | Augustine et al. | |
| 11,699,309 B2 | 7/2023 | Carver et al. | |
| 11,836,802 B2 | 12/2023 | Carver et al. | |
| 2007/0027583 A1 | 2/2007 | Tamir et al. | |

(Continued)

FOREIGN PATENT DOCUMENTS

| | | |
|---|---|---|
| JP | 2004-280454 | 10/2004 |
| WO | WO 2019/023589 | 1/2019 |

OTHER PUBLICATIONS

U.S. Appl. No. 16/852,037 Office Action dated Jul. 5, 2023.

(Continued)

*Primary Examiner* — Isaac G Smith
(74) *Attorney, Agent, or Firm* — Polsinelli LLP

(57) ABSTRACT

Driver safety, vehicle safety, and environment safety may be scored based on a variety of input data concerning a driver, a vehicle, or an environment in which the vehicle drives. An overall safety score may be generated based on at least some of these three scores. These scores may be compared to thresholds to trigger or initiate actions such as providing notifications to drivers, raising or reducing vehicle insurance rates, providing coupons and promotions to drivers, or limiting vehicle speed in a manner that is personalized to the driver and/or vehicle and/or environment.

20 Claims, 10 Drawing Sheets

(56) References Cited

U.S. PATENT DOCUMENTS

| | | |
|---|---|---|
| 2011/0025483 A1 | 2/2011 | Yano et al. |
| 2012/0101855 A1 | 4/2012 | Collins et al. |
| 2012/0123806 A1 | 5/2012 | Schumann, Jr. et al. |
| 2014/0046701 A1 | 2/2014 | Steinberg et al. |
| 2015/0112546 A1 | 4/2015 | Ochsendorf et al. |
| 2015/0246676 A1 | 9/2015 | Keren |
| 2015/0279212 A1 | 10/2015 | Otake |
| 2016/0114807 A1 | 4/2016 | Phelan et al. |
| 2016/0125669 A1 | 5/2016 | Meyer et al. |
| 2016/0155277 A1 | 6/2016 | Asada et al. |
| 2017/0057492 A1 | 3/2017 | Edgington et al. |
| 2017/0287233 A1 | 10/2017 | Nix |
| 2018/0059687 A1 | 3/2018 | Hayes et al. |
| 2019/0019133 A1 | 1/2019 | Allen |
| 2019/0156150 A1 | 5/2019 | Krishnan |
| 2019/0289446 A1 | 9/2019 | Kim |
| 2019/0318620 A1 | 10/2019 | Yang et al. |
| 2020/0130688 A1 | 4/2020 | Kline et al. |
| 2020/0286310 A1 | 9/2020 | Carver et al. |
| 2020/0334762 A1 | 10/2020 | Carver et al. |

OTHER PUBLICATIONS

U.S. Appl. No. 16/852,037 Office Action dated Mar. 15, 2023.
U.S. Appl. No. 16/852,037 Final Office Action dated Dec. 12, 2022.
U.S. Appl. No. 16/852,037 Office Action dated May 31, 2022.
U.S. Appl. No. 16/797,293 Final Office Action dated Sep. 29, 2022.
U.S. Appl. No. 16/797,293 Office Action dated Apr. 14, 2022.
U.S. Appl. No. 16/797,293, Christopher J. Carver, Dynamic Driver and Vehicle Analytics Based on Vehicle, filed Feb. 21, 2020.
U.S. Appl. No. 62/813,567, Christopher J. Carver, Dynamic Driver and Vehicle Analytics Based on Vehicle, filed Mar. 4, 2019.

* cited by examiner

*FIG. 3A*

$$\text{Overall Score } \underline{250} = \frac{(\text{Driver Score } \underline{235}) \times (M_1\ \underline{310}) + (\text{Vehicle Score } \underline{240}) \times (M_2\ \underline{320}) + (\text{Envirmnt Score } \underline{245}) \times (M_3\ \underline{330})}{(M_1\ \underline{310}) + (M_2\ \underline{320}) + (M_3\ \underline{330})}$$

$\overbrace{\qquad\qquad}^{300}$

*FIG. 3B*

$$\text{Driver Score } \underline{235} = \frac{(\text{Driver Element Score } \underline{360}) \times (N_1\ \underline{365}) + (\text{Driver Element Score } \underline{370}) \times (N_2\ \underline{375})}{(N_1\ \underline{365}) + (N_2\ \underline{370})}$$

$\overbrace{\qquad\qquad}^{350}$

FIG. 7

| VIN | Odometer | Date/Time Read | Driver Score | Vehicle Score | Envirmt Score |
|---|---|---|---|---|---|
| 1C6RD7KT7CS335395 | 84,685 | 2/14/2014 1905 GMT | 3.2 | 2.3 | 4.2 |
| 1GKET63M882174353 | 103,578 | 2/14/2014 1908 GMT | 1.9 | 4.1 | 3.1 |
| 3FADPOL33AR361555 | 64,532 | 2/14/2014 1901 GMT | 4.9 | 1.0 | 3.7 |
| 1FMCU9D72AKC59524 | 86,214 | 2/14/2014 1915 GMT | 5.0 | 3.5 | 3.8 |
| 1FMCU9DG2BKB46819 | 112,981 | 2/14/2014 1927 GMT | 2.1 | 4.1 | 4.1 |
| 1GKET63M882174353 | 88,211 | 2/14/2014 1915 GMT | 3.4 | 2.7 | 1.8 |

DYNAMIC DRIVER AND VEHICLE ANALYTICS BASED ON VEHICLE TRACKING AND DRIVING STATISTICS

CROSS REFERENCE TO RELATED APPLICATIONS

The present application is a continuation and claims the priority benefit of U.S. patent application Ser. No. 16/797,293 filed Feb. 21, 2020, now U.S. Pat. No. 11,699,309, which claims the priority benefit of provisional U.S. patent application Ser. No. 62/813,567 filed Mar. 4, 2019, the disclosures of which are incorporated herein by reference.

BACKGROUND OF THE INVENTION

Field of the Invention

The present invention generally pertains to tracking the geographic location of vehicles in relation to other vehicles. More specifically, the present invention pertains to utilizing location based technologies to identify driver abnormalities in an ad hoc traffic flow.

Description of the Related Art

A Global Navigation Satellite System (GNSS) is a satellite-based geo-spatial positioning system in which a GNSS receiver device receives signals broadcast by multiple GNSS satellites orbiting the Earth, and, based on the signals from these satellites, is able to determine its own location. Common GNSS systems include the US-based Global Positioning System (GPS), the Russia-based Global Navigation Satellite System (GLONASS), the China-based BeiDou Navigation Satellite System (BDS), and the Europe-based Galileo GNSS.

Some vehicles include navigation devices with integrated GNSS receivers that may be used together with road maps stored on the navigation device to determine a current location of the vehicle within a city's road infrastructure and to assist the driver in determining how to arrive at a desired destination from their current location via the city's road infrastructure. These navigation devices may be built into the vehicle itself, as in a dashboard computer, or may simply be located within the vehicle, as in a driver's smartphone.

A category of insurance referred to as usage-based insurance ("UBI") has recently been gaining popularity as a way for insurance companies to more fairly allocate risk among their customers. Under UBI, vehicle usage data is shared, directly or indirectly, with insurance carriers, who then estimate risk based on this vehicle usage data and price insurance accordingly. At least in theory, UBI should benefit drivers whose vehicles are not driven as often and are therefore exposed to less risk. However, the data upon which UBI relies on is not always reliable and sometimes lacks context, leading to potentially unfair or inaccurate judgments as to allocation of risk. In particular, UBI is traditionally based on very simple tracking of distances traveled, as by an odometer. Such simple tracking information generally provides no insight into how safely the driver drives, in what environmental conditions the vehicle is driven in, or the condition of the vehicle—all of which impact risk. Failure to consider such factors limits UBI's usefulness and accuracy, and essentially treats safe driving identically to unsafe driving.

Additionally, UBI can in some cases present privacy issues in that more data is collected and shared about drivers and vehicles than ever before—some of which can be sensitive, such as location data from which an individual's location could be inferred. As increasingly strict privacy laws are increasingly put in place around the world, such data is risky to share widely without protection. Finally, UBI does nothing to assist drivers or organizations employing drivers to improve driving.

Traditional vehicle analytics are technically problematic because they are inaccurate and insufficient to generate accurate analytics for vehicle and driver behavior. There is a need for technological improvements in vehicle operation capture, interpretation, analytics, feedback, and enhancement.

SUMMARY OF THE PRESENTLY CLAIMED INVENTION

Techniques and systems are described for analyzing driver behavior. In one example, a method may include receiving kinematic data from a computing device at a vehicle that is operated be a driver. The received kinematic data may characterize movement of the vehicle over a first time period. The method may also include generating a driver safety score for the driver based on the received kinematic data and updating the driver safety score based on additional kinematic data received over a second time period. The method may also identify that the driver safety score has reached a first threshold level, and an action may be initiated based on the driver safety score reaching the first threshold.

In another example, a non-transitory computer-readable storage medium stores instructions that, when executed by a processor, implement a method of analyzing driver behavior. The method may include receiving kinematic data from a computing device at a vehicle that is operated be a driver. The received kinematic data may characterize movement of the vehicle over a first time period. The method may include generating a driver safety score for the driver based on the received kinematic data and updating the driver safety score based on additional kinematic data received over a second time period. The method may include identifying that the driver safety score has reached a first threshold level and an action may be initiated based on the driver safety score reaching the first threshold.

In another example, an apparatus for analyzing driver behavior includes a memory storing instructions and a processor that executes the instructions. Execution of the instructions by the processor causes the processor to perform system operations, which include generating a driver safety score based on kinematic data received from a computing device at a vehicle operated by a driver. The kinematic data characterizes movement of the vehicle over a first time period associated with the driver operating the vehicle. The system operations also include updating the driver safety score based on additional kinematic data received over a second period of time and identifying that the driver safety score has reached a first threshold level after updating the driver safety score. The system operations also include initiating an action based on the driver safety score reaching the first threshold level.

BRIEF DESCRIPTION OF THE DRAWINGS

FIG. 3A is an equation for calculating an overall score based on a driver score, a vehicle score, and an environment score.

FIG. 3B is an equation for calculating a driver safety score based on safety of individual elements of information about a driver.

FIG. 7 is a table illustrating collection of vehicle data that includes VIN number, odometer readings, dates, times, annual distances travelled, radii of operation, and photos.

DETAILED DESCRIPTION

Driver safety, vehicle safety, and environment safety may be scored based on a variety of input data concerning a driver, a vehicle, and an environment in which the vehicle drives. An overall safety score may be generated based on at least some of these three scores. These scores may be compared to thresholds to trigger performance of actions such as providing notifications to drivers, raising or reducing insurance rates, providing coupons and promotions, or limiting vehicle speed.

Figure 1:
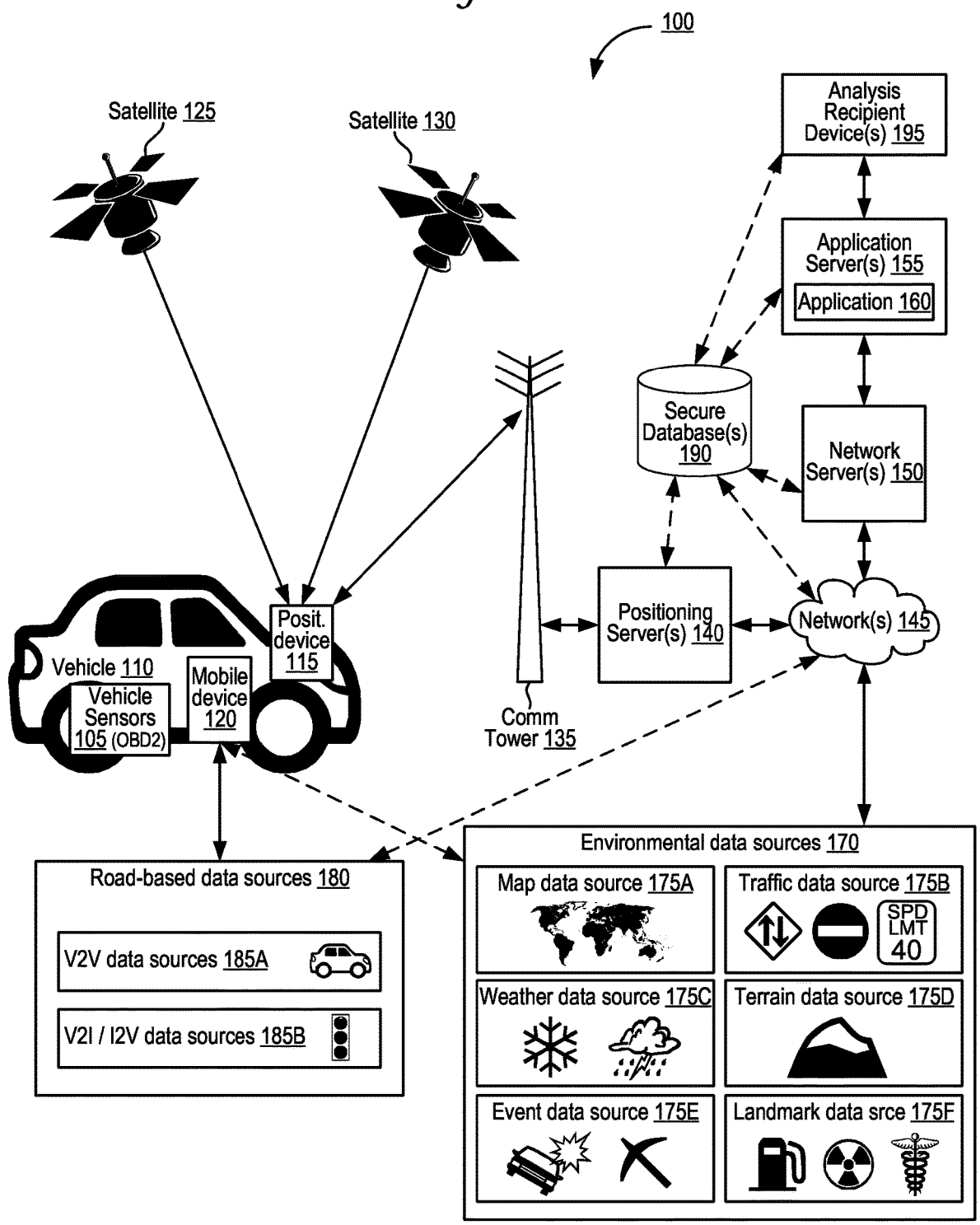
FIG. 1 illustrates a system for retrieval of information from and about vehicles, infrastructure, environments, and drivers.

FIG. 1 illustrates a system for retrieval of information from and about vehicles, infrastructure, environments, and drivers.

The system 100 of FIG. 1 includes a vehicle 110, a positioning device 115 with a GNSS receiver, a mobile device 120, vehicle sensors 105, GNSS positioning satellites 125 and 130, a communications tower 135, a positioning server 140, a network 145, a network server 150, an application server 155, secure databases 190, recipient devices 195, environment data sources 170, and road-based data sources 180. The application server 155 executes an application 160, which is described in greater detail below. The various environmental data sources 175A, 175B, 175C, 175D, 175E, and 175F included in FIG. 1 may be computers connected to the Internet or other communication network that provide data to user devices. For example, a data source may be a server operated by an information source network such as Google® or AccuWeather®, may be a computer operated by highway patrol, may be a device that collects data along a roadway, or some combination thereof.

Though vehicle 110 is illustrated in FIG. 1 as an automobile, it may be any type of vehicle 110 that travels on or through any type of throughway. Vehicle 110 may travel via roads, waterways, airways, or other throughways. The terms "road" or "street" as used herein may include public roads, private roads, toll roads, highways, freeways, residential streets, driveways, bridges, off-road trails, bike lanes, pathways, other thoroughfares allowing for travel via a land-based vehicle, or combinations thereof. A land-based vehicle may be an automobile, a semi-truck, a shipping truck, a motorcycle, a bicycle, a tricycle, a scooter, a sidecar, a pedicab, a Segway®, or combinations thereof.

The vehicle 110 may include a positioning device 115 that may include one or more GNSS receivers that receive from communication satellites 125 and 130 of one or more GNSS types. The positioning device 115 may further communicate with a wireless, data, or cellular communication system by way of the likes of communications tower 135, either via the mobile device 120 or on its own. Positioning device 115 may receive signals from one or more positioning satellites 125 and 130 and determine its geographic location based on the received signals, for example identifying latitude and longitude coordinates, comparing them to map data that is stored at the positioning device 115 and/or received from one or more map servers or positioning servers 140. The positioning device 115 may thereby identify its own position not only using latitude and longitude coordinates, but along particular roads, waterways, airways, or other throughways. The positioning device 115 may be coupled to, secured within, or otherwise disposed within vehicle 110, and may thereby determine the position of the vehicle 110 by determining the position of the positioning device 115. The positioning satellites 125 and 130 may be part of the US-based Global Positioning System (GPS), the Russia-based Global Navigation Satellite System (GLONASS), the China-based BeiDou Navigation Satellite System (BDS), the Europe-based Galileo GNSS, another GNSS system, or combinations thereof. Ideally, at least three satellites would be used to make triangulation possible, though an imprecise location estimate may sometimes be determined from one or two.

While FIG. 1 illustrates GNSS satellites 125 and 130, it should be understood that the positioning device 115 need not include a GNSS receiver, but may instead identify its position based on receipt of one or more signals from land-based signals whose sources have known locations, such as signals from one or more cellular or radio communication towers 135. Ideally, at least three land-based signal sources would be used to make triangulation possible, though a less precise location estimate may be determined from one or two signal sources.

Positioning device 115 may communicate the positioning data either on its own or through mobile device 120 via a cellular communication network by use of communications tower 135, which receives and conveys cellular communications onward throughout a cellular network. The positioning data may be conveyed using a format associated with a particular GNSS, using one or more latitude/longitude coordinates, using one or more street names, using one or more street addresses, or combinations thereof. Positioning device 115 may alternately or additionally communicate the positioning data either on its own or through mobile device 120 via radio frequency signals, wireless local area network (WLAN), 802.11 Wi-Fi, microwave frequency signals, or combinations thereof.

Positioning device 115 may be attached to and/or secured within the vehicle 110, as in a dashboard navigation computer. Positioning device 115 may be included within a mobile device 120 disposed within the vehicle, such as a GNSS receiver and/or positioning chipset within a smartphone or tablet device. The positioning device 115 may be associated with the vehicle 110, an owner of the vehicle, the driver of the vehicle, an employer of the driver of the vehicle, a passenger within the vehicle, an employer of the passenger of the vehicle, or combinations thereof. Likewise, the mobile device 120 may be associated with the vehicle 110, an owner of the vehicle, the driver of the vehicle, an employer of the driver of the vehicle, a passenger within the vehicle, an employer of the passenger of the vehicle, or combinations thereof.

Communications tower 135 may communicate the location information received for vehicle 110 to positioning server 140 and/or network server 150 and/or application server 155. The positioning server 140 of FIG. 1 may be a server associated with a particular GNSS, may be a map/navigation server that provides map data, or a combination thereof. Though cellular networks and communication systems are discussed herein, other communication networks may be used to communicate the GPS and identity data to an application, such as but not limited to satellite communication technology.

Network server 150 may communicate with positioning server 140 or directly with the communication tower 135 through a communication network 145, such as a local area network (LAN) or the Internet. Application server 155 may communicate with network server 150 and/or positioning server 140 and/or the communication tower 135 through a LAN or the Internet. Network server 150 may be implemented as one or more servers implementing a network service. The network server may receive positioning data, perform preliminary processing on the data, and provide the positioning data to application server 155. Positioning server 140, network server 150, and application server 155 may be implemented using one or more computing devices as discussed below with respect to FIG. 10.

Network 145 may facilitate communication of data between different servers, devices and machines, such as positioning server 140, network server 150, and application server 155. The network may be implemented, for example, as a private network, public network, intranet, the Internet, a wide area network (WAN), a local area network (LAN), a wireless local area network (WLAN), or combinations thereof.

Application server 155 may be implemented as one or more server computing devices, and includes computer program instructions corresponding to an application 160, which may be executed by one or more processors of the application server 155 to cause the application server 155 to perform application operations associated with the application 160. Application 160 may receive positioning data associated with positioning device 115 and/or mobile device 120. Application 160 may then, through application server 155, process the positioning data along with other geo-data, and identify vehicle and/or driver behavior.

Vehicle and/or driver behavior may be stored in a secure database 190 or other data structure, which may be stored on any kind of memory 1020, mass storage 130, or portable storage 1040, or another non-transitory computer-readable storage medium by the application server 155 as part of the application operations of the application 160. The application operations may then include various analyses of the stored vehicle status and/or driver behavior and/or environment status as discussed further with respect to FIG. 2, and it may then send this analysis to one or more recipient devices 195. The one or more recipient devices 195 may include one or more intermediate recipient devices 195 that then optionally process the received analysis and send data further to other recipient devices 195. In some cases, the recipient devices 195 may include the mobile device 120 associated with the vehicle 110, which may be a mobile device 120 a driver of the vehicle 110. The recipient devices 195 may also include devices associated with a driver's employer or contractee, a driver's auto insurance carrier, a driver's health insurance carrier, and employer or contractee's insurance carrier, a vehicle manufacturer, a vehicle distributor, a vehicle fleet manager or administrator, or combinations thereof.

The vehicle 110 may include, or have coupled thereto, one or more vehicle sensors 105 and/or interfaces, which may include diagnostic sensors and corresponding interfaces such as on-board diagnostics (OBD) implementations. OBD implementations included in or accessible by the vehicle sensors 105 may include, for example, Assembly Line Diagnostic Link (ALDL), OBD-I, OBD-1.5, OBD-II, Multiplex OBD (M-OBD), European OBD (E-OBD), Japan OBD (J-OBD), Australian Design Rule 79/01 (ADR 79/01), ADR 79/02, variants thereof, or combinations thereof. The one or more vehicle sensors 105 may retrieve data about vehicle maintenance, oil level, headlight functionality status, brake pad functionality status, brake light functionality status, battery level, tire pressure, estimated/actual tire wearing status, time since last tire replacement, time since last oil change, time since last brake pad replacement, time since last tire rotation, odometer mileage, seatbelt functionality status, airbag functionality status, number of major collisions detected by accelerometers, number of minor collisions detected by accelerometers, time since last maintenance, number of major repairs, number of minor repairs, steering column integrity, chassis integrity, vehicle temperature, engine status, vehicle top speed reached, intake air temperature, fan functionality status, air conditioning functionality status, heating functionality status, engine coolant temperature, freeze detection status, overheating detection status, oxygen sensor status, warm-ups since codes cleared, distance travelled since codes cleared, warm-ups overall, distance travelled overall, fuel tank level, absolute barometric pressure, catalyst temperature, ambient air temperature, throttle position, fuel-air ration, time since trouble codes cleared, fuel type, ethanol fuel percentage, vapor pressure, fuel pressure, fuel injection timing, engine fuel rate, driver's demand pressure, engine torque, engine coolant temperature, intake air temperature, fuel pressure, inlet pressure, rotations per minute (RPM) history, wastegate control, filter functionality status, engine runtime history, engine friction, boost pressure, turbocharger pressure, NOx pressure, estimated/actual fuel efficiency, and similar measurements. Data from the vehicle sensors 105 may be read by the mobile device 120 and sent through to communication tower 135 and network 145 to application server 155, which may use data from the vehicle sensors 105 as part of its analysis of driver behavior and vehicle status, through which it generates, for example, the driver safety score 235 and vehicle safety score 240 of FIG. 2. The vehicle sensors 105 may include, for example, one or more of any of the following: accelerometers, gyroscopes, gryometers, barometers, magnetometers, compasses, inertial navigation systems (INSs), inertial measurement units (IMUs), inertial reference systems (IRSs), inertial reference units (IRUs), GNSS sensors, brake wear indicators, brake sensors, still image cameras, video cameras, microphones, horn honk usage/pressure sensors, night vision cameras/sensors, rear vision cameras, blind spot detection cameras/sensors, collision sensors, side curtain sensors, steering angle sensors, airbag sensors, wheel speed sensors, cross traffic alert sensors, automatic brake actuator sensors, laser rangefinders, RADAR sensors, LIDAR sensors, active park assist sensors, tire pressure sensors, infrared pedestrian detection/warning sensors, automatic speed control device (ASCD) sensors, lane departure detection sensors, adaptive cruise control sensors, mass air flow (MAF) sensors, engine speed sensors, oxygen sensors, manifold absolute pressure (MAP) sensors, spark knock sensors, fuel temperature sensors, thermometers, thermistors, photoresistors, phototransistors, voltage sensors, voltmeters, ammeters, multimeters, accelerator pedal sensors, brake fluid pressure sensors, barometric pressure sensors, air bag impact sensors, air charge temperature sensors, air cleaner temperature sensors, camshaft position sensors, coolant temperature sensors, crankshaft position sensors, exhaust gas recirculation (EGR) position sensors, EGR valve pressure sensors, engine crankcase pressure sensors, engine rotations per minute (RPM) sensors, engine variable sensors, exhaust temperature sensors, fuel injection pressure sensors, fuel injection timing sensors, heater core temperature sensors, hybrid phase current sensors, ignition misfire sensors, ignition passlock sensors, knock (detonation) sensors, power door resistance sensors, fuel temperature sensors, turbo boost sensors, tail light outage sensors, tachometer sensors, suspension yaw sensors, suspension position sensors, throttle position sensors, top dead center (TDC) sensors, tire pressure monitoring sensors, vacuum sensors, vehicle transmission speed sensors, backup sensors, or combinations thereof.

The environmental data sources 170 also supply data to the application servers 155 through network 145, and may also optionally provide data to the mobile device 120 and/or recipient device 195. The environmental data sources 170 may include one or more map data sources 175A providing maps of roads and other thoroughfare, one or more traffic data sources 175B providing data about traffic and speed limits and directional restrictions on roads or thoroughfares, one or more weather data sources 175C providing data about weather conditions in the sky and on roads, one or more terrain data sources 175D providing data about terrain and elevation and road types (e.g., paved, unpaved, asphalt, cobblestone, dirt, rocky, off-road), one or more event data sources 175E providing data about accidents and construction zones and street festivals and other events that might disrupt or slow driving, one or more landmark data sources 175F providing data about buildings and gas stations and hazardous areas, or combinations thereof. Data from the environmental data sources 170 may be sent through network 145 to application server 155, which may use data from the environmental data sources 170 as part of its analysis of environmental status, through which it generates, for example, the environment safety score 245 of FIG. 2.

The road-based data sources 180 may include vehicle-to-vehicle (V2V) data sources 185A, referring to data received by the vehicle 110 (or by the mobile device 120) from other vehicles (or corresponding mobile devices). The road-based data sources 180 may include infrastructure-to-vehicle (I2V) data sources 185B, referring to data received by the vehicle 110 (or by the mobile device 120) from roadside infrastructure, such as sensors mounted on traffic lights or speed cameras or street signs. The road-based data sources 180 may include infrastructure-to-vehicle (I2V) data sources 185B, referring to data received by infrastructure from the vehicle 110 (or mobile device 120) or from other vehicles (or corresponding mobile devices), which the infrastructure can then communicate to the vehicle 110 (or mobile device 120) through V2I. Examples of V2V data, I2V data, and V2I data may include cameras, positioning devices, proximity sensors, vehicle sensors, environment sensors, and the like. In fact, any of the data types or sensor types discussed with respect to the vehicles sensors 105 and/or environmental data sources 170 may be conveyed by the road-based data sources 180. While the road-based data sources 180 are illustrated communicating to the mobile device 120, it should be understood that they may communicate more directly to the application servers 155 through networks 145.

Figure 10:
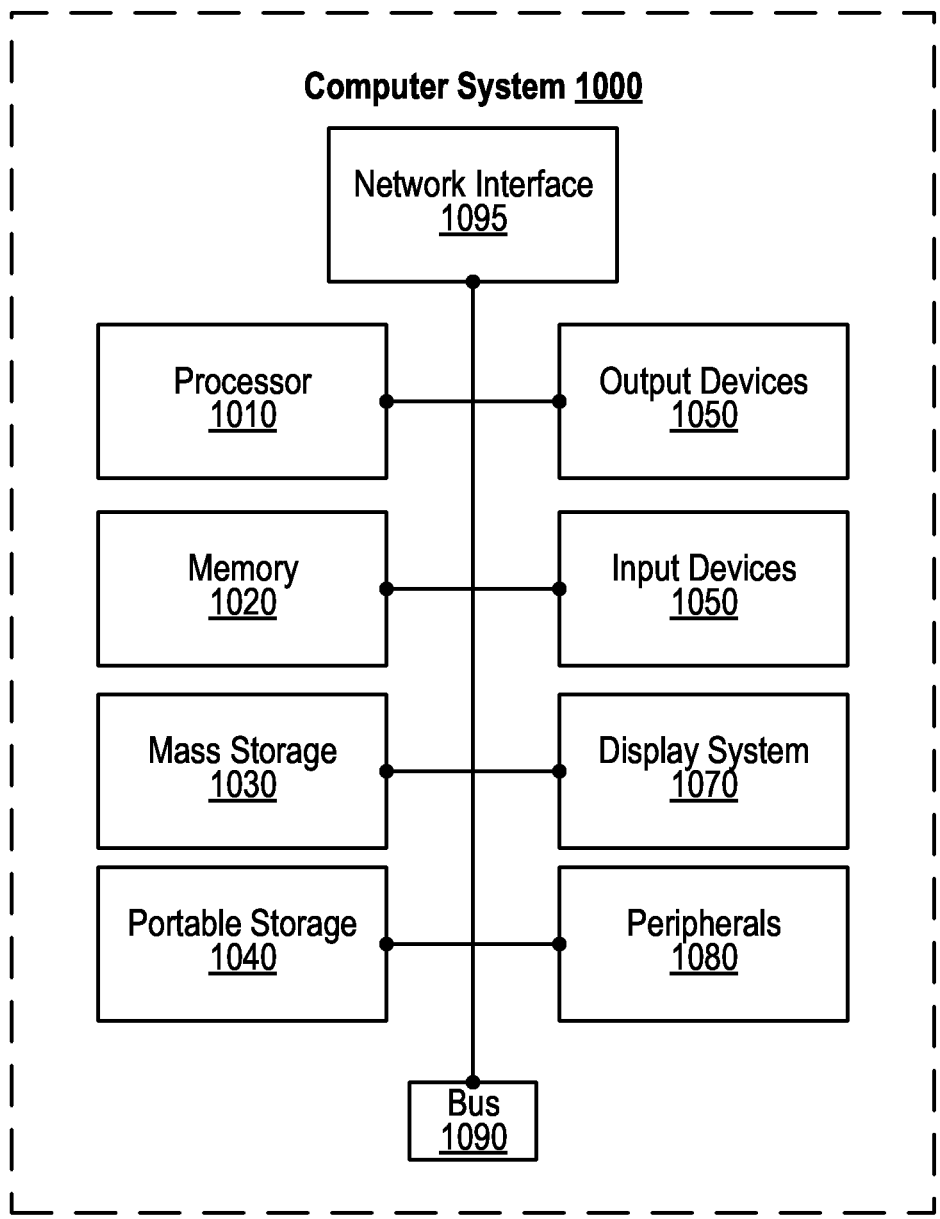
FIG. 10 is a first block diagram of an exemplary computing device that may be used to implement some aspects of the subject technology.

All of the devices illustrated in FIG. 1— including the vehicle 110, positioning device 115, mobile device 120, vehicle sensors 105, GNSS positioning satellites 125 and 130, communications towers 135, positioning servers 140, a network 145, network servers 150, application servers 155, secure databases 190, recipient devices 195, environment data sources 170, and road-based data sources 180—may be or may include one or more computing devices 1000 of FIG. 10, and/or may include one or more of the components and/or elements illustrated in and/or discussed with respect to FIG. 10. Furthermore, the one or more secure databases 190 may store data from any combination of these devices: vehicle 110, positioning device 115, mobile device 120, vehicle sensors 105, GNSS positioning satellites 125 and 130, communications towers 135, positioning servers 140, a network 145, network servers 150, application servers 155, secure databases 190, recipient devices 195, environment data sources 170, and road-based data sources 180.

Figure 2:
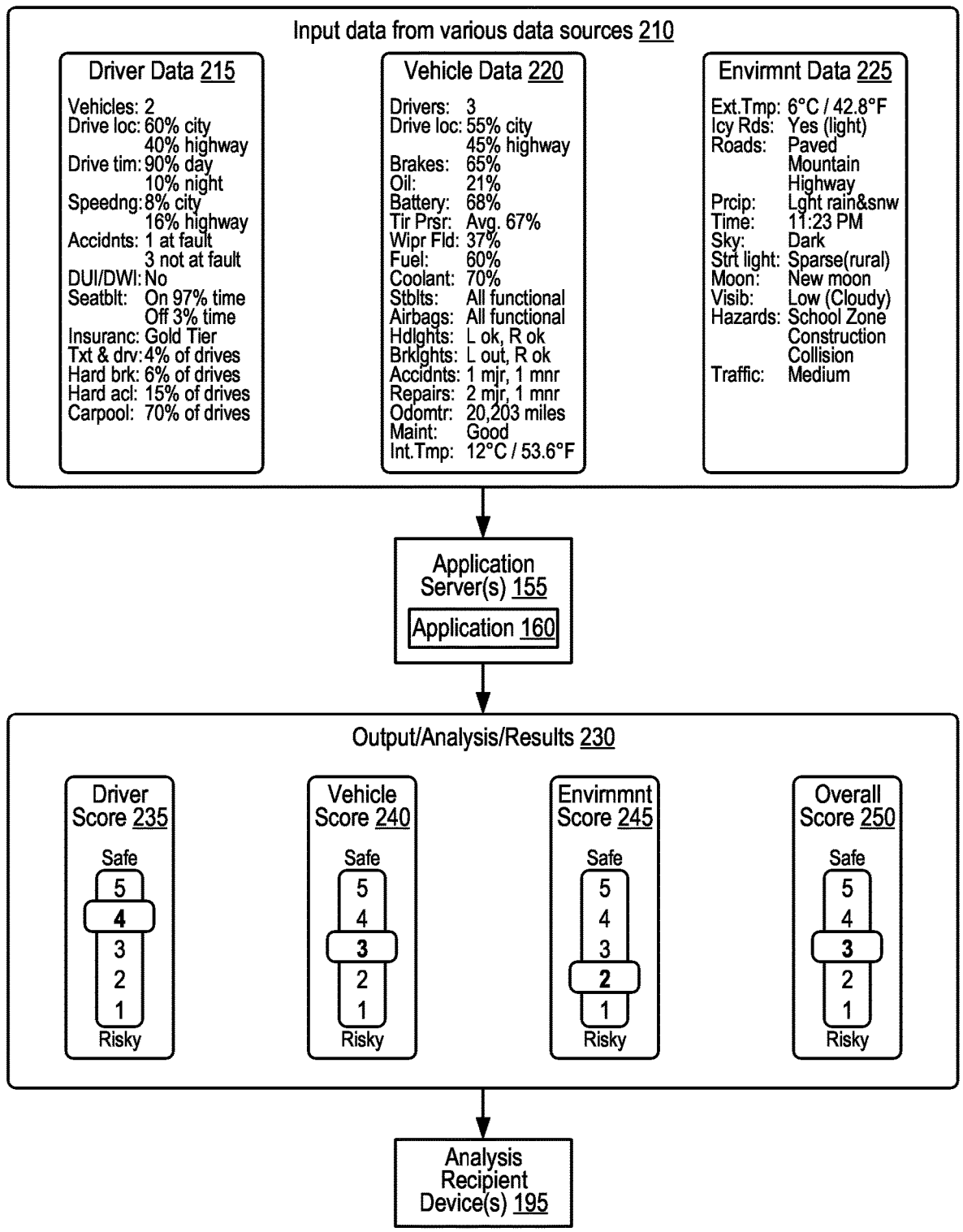
FIG. 2 illustrates input data concerning a driver, a vehicle, and an environment, as well as output analysis results based on the input data.

FIG. 2 illustrates input data concerning a driver, a vehicle, and an environment, as well as output analysis results based on the input data.

In particular, FIG. 2 illustrates input data 210 from various sources being input into the application server(s) 155 of FIG. 1 to be processed by the application 160 of FIG. 1, which generates, outputs, and sends analysis results 230 to one or more recipient devices 195 of FIG. 1. The input data 210 may include any of the types of input data illustrated in or discussed with respect to FIG. 1 and may be from any of the data sources (or types of data sources) illustrated in or discussed with respect to FIG. 1. In particular, the input data 210 of FIG. 2 includes driver data 215, vehicle data 220, and environment data 225. The driver data 215 of FIG. 2 may be referred to as kinematic data, as this data relates to the movement of one or more vehicles over time, and this kinematic data may be used to calculate driver safety scores 235 and/or vehicle safety scores 240 consistent with the present disclosure.

The particular driver data 215 used for the analysis illustrated in FIG. 2 identifies that the driver drives two vehicles, that the driver drives along city streets 60% of the time and along highways 40% of the time, that the driver drives during the daytime 90% of the time and during the nighttime 10% of the time, that the driver speeds 8% of the time while driving on city roads, that the driver speeds 16% of the time while driving on highway roads, that the driver was involved in one accident in which he/she was judged to be at fault, that the driver was involved in two accidents in which he/she was judged to be not at fault, that the driver has not been charged with driving under the influence (DUI) or driving while intoxicated (DWI), that the driver wears his/her seatbelt 97% of the time while driving, that the driver does not wear his/her seatbelt 3% of the time while driving, that the driver is registered for "gold tier" auto insurance, that the driver texts while driving on 4% of drives, that the driver performs hard brakes on 6% of drives, that the driver performs hard accelerations on 4% of drives, that the driver carpools 70% of the time. Other possible types of driver data 215 are identified with respect to FIG. 1.

The application 160 running on the application server(s) 155 produces the driver safety score 235 based on at least a subset of the driver data 215 (and optionally based on at least a subset of the vehicle data 220 and/or the environment data 225 where applicable to how safe the driver is). In FIG. 2, a scale from 1 to 5 is used, with 1 being very risky, 2 being fairly risky, 3 being neutral, 4 being fairly safe, and 5 being very safe. The driver safety score 235 of FIG. 2 is 4 out of 5, indicating that the driver is fairly safe. This may be calculated using an average, optionally a weighted average, of the different elements listed in the input data 210 that are used to calculate the driver safety score 235, as in the driver score equation 350 of FIG. 3B.

The particular vehicle data 220 used for the analysis illustrated in FIG. 2 identifies that the vehicle has 3 drivers, that the vehicle is used to drive on city roads 55% of the time and on highway roads 45% of the time, that the brakes have 65% estimated or actual remaining lifespan, that the oil has 21% estimated or actual remaining lifespan, that the battery has 68% estimated or actual remaining charge, that the average tire pressure of the four tires is 67%, that the wiper fluid is estimated to be or is actually 37% full, that the fuel tank is estimated to be or is actually 60% full, that the coolant is estimated to be or is actually 70% full, that the seatbelts are all functional, that the airbags are all functional, that the left and right headlights are both functional, that the left brake light is out but the right brake light is functional, that the vehicle has been involved in one major accident and one minor accident, that the has been involved in two major repairs and one minor repair, that the odometer reads 20,203 miles, and that the maintenance record is good, and that the vehicle's internal temperature is 12 degrees Celsius (53.6 degrees Fahrenheit). Other possible types of vehicle data 220 are identified with respect to FIG. 1.

The application 160 running on the application server(s) 155 of FIG. 1 produces the vehicle safety score 240 based on at least a subset of the vehicle data 220 (and optionally based on at least a subset of the driver data 215 and/or the environment data 225 where applicable to how safe the vehicle is). The vehicle safety score 240 of FIG. 2 is 3 out of 5, indicating that the vehicle is neutral in terms of safety. This may be calculated using an average, optionally a weighted average, of the different elements listed in the input data 210 that are used to calculate the vehicle safety score 235, similarly to how the driver score 235 is calculated using the driver score equation 350 of FIG. 3B.

The particular environment data 225 used for the analysis illustrated in FIG. 2 identifies that the ambient temperature outside the vehicle is 6 degrees Celsius (42.8 degrees Fahrenheit), that the roads along which the vehicle 110 is traveling or is scheduled to travel or are nearby are lightly icy, that the roads along which the vehicle 110 is traveling or is scheduled to travel or are nearby are mainly paved and mountainous highway roads, that light rain and snow is occurring or is expected to occur along the roads along which the vehicle 110 is traveling or is scheduled to travel or are nearby, that the current time is 11:23 PM, that the sky is currently dark or will be dark when the vehicle 110 is scheduled to drive, that the moon is a new moon (indicating little moonlight while a full moon indicates more moonlight), that the street lighting is sparse for the roads along which the vehicle 110 is traveling or is scheduled to travel or are nearby due to these roads/regions being mainly rural, that the visibility is currently or is expected to be low due to cloudy skies, that traffic is currently or is expected to be medium, and that hazards on the roads along which the vehicle 110 is traveling or is scheduled to travel or are nearby include one or more school zones and construction zones and one or more accidents/collisions. Other possible types of environment data 225 are identified with respect to FIG. 1.

The application 160 running on the application server(s) 155 of FIG. 1 produces the environment safety score 245 based on at least a subset of the environment data 225 (and optionally based on at least a subset of the driver data 215 and/or the vehicle data 220 where applicable to how safe the environment is). The environment safety score 245 of FIG. 2 is 2 out of 5, indicating that the environment is fairly risky. This may be calculated using an average, optionally a weighted average, of the different elements listed in the input data 210 that are used to calculate the environment safety score 245, similarly to how the driver score 235 is calculated using the driver score equation 350 of FIG. 3B.

It should be understood that the environment data 225, and the resulting environment safety score 245, can represent a number of different scopes. That is, the environment data 225 and resulting environment safety score 245 can be narrowly focused on the environment in the immediate vicinity of the vehicle 110 at any given point. Alternately, the environment data 225 and resulting environment safety score 245 can be focused on the environment along a particular road or route (that includes one or more roads) along which of the vehicle 110 is traveling, has just traveled, or is scheduled to travel. Alternately, the environment data 225 and resulting environment safety score 245 can be focused on the environment within a larger region in which the vehicle 110 is located and/or in which a particular road or route (that includes one or more roads) is located, such as a block, a neighborhood, a city district/borough/suburb, a city, a metropolitan area, a county, a state, a province, a division, a subdivision, a jurisdiction, a country or nation, a multinational area, a continent, a multicontinental area, or worldwide.

The output 230 of FIG. 2 also includes an overall score 250, calculated using a weighted average of the driver score 235, the vehicle score 240, and the environment score 245 as discussed further in FIG. 3A.

FIG. 3A is an equation for calculating an overall score based on a driver score, a vehicle score, and an environment score. The equation 300 of FIG. 3A is a mean calculation that introduces multipliers into both the numerator and denominator. In the numerator, the driver safety score 235 multiplied by a first multiplier value $M_1$ 310, the vehicle safety score 240 is multiplied by a multiplier value $M_2$ 320, and the environment safety score 245 is multiplied by a multiplier value $M_3$ 330. The denominator is the sum of the three multipliers (multiplier $M_1$ 310, multiplier $M_2$ 320, and multiplier $M_3$ 330).

A higher multiplier value indicates that the corresponding index that the multiplier multiplies will be weighted more heavily. For example, the driver safety score 235 can be ranked as most important and therefore can be weighted to have more influence on the overall safety score 250 when the multiplier $M_1$ 310 is a higher value than multipliers $M_2$ 320 and $M_3$ 330. The vehicle safety score 240 can be ranked as most important and therefore can be weighted to have more influence on the overall safety score 250 when the multiplier $M_2$ 320 is a higher value than multipliers $M_1$ 310 and $M_3$ 330. The environment safety score 245 can be ranked as most important and therefore can be weighted to have more influence on the overall safety score 250 when the multiplier $M_3$ 330 is a higher value than multipliers $M_1$ 310 and $M_2$ 320.

An additional safety score not shown in FIG. 2 or FIG. 3A, multiplied by a corresponding multiplier not shown in FIG. 2 or FIG. 3A, can also be added to the numerator of the equation 300, with the corresponding multiplier also being added to the denominator of the equation 300. Similarly, in some cases, the overall safety score 250 can be calculated without factoring in certain scores at all, essentially by setting their corresponding multipliers to a value of zero, removing the corresponding score(s) from having any impact on the calculation 300 of the overall safety score 250.

The multipliers may have different values depending on how important certain factors are in determining overall safety, and how fair it is to consider the impact of certain factors in deciding punishments and rewards such as increases or decreases to insurance premiums. For example, as any vehicle drives, the environment score 245 may sometimes change rapidly as time passes, as driving at night presents hazards not present during the daytime, and may also change as the vehicle drives through different areas with distinct climates, road conditions, traffic conditions, and the like. In some cases, the environment score 245 may be removed from consideration, or may be weighted as less important than the driver score 235 and vehicle score 240, for example using a lower multiplier $M_3$ 330. In areas where large environmental shifts greatly impact safety, however, a higher multiplier $M_3$ 330 may be valuable.

FIG. 3B is an equation for calculating a driver safety score based on safety of individual elements of information about a driver. Individual elements of information about a driver may each be scored based on recorded sensor measurements and/or historical data, which may be then compared to thresholds to determine how safe each individual element of information is. Using the seatbelt wearing element in the driver data 215 of FIG. 2 as an example of an element of information about the driver, the driver wearing his/her seatbelt between 95% to 100% of the time could correspond to a safety rating for the element of 5 (very safe), the driver wearing his/her seatbelt between 90% to 94.9% of the time could correspond to a safety rating for the element of 4 (fairly safe), the driver wearing his/her seatbelt between 85% to 89.9% of the time could correspond to a safety rating for the element of 3 (neutral), the driver wearing his/her seatbelt between 80% to 84.9% of the time could correspond to a safety rating for the element of 2 (fairly unsafe), and the driver wearing his/her seatbelt less than 80% of the time could correspond to a safety rating for the element of 1 (very unsafe). Because seatbelt wearing element in the driver data 215 of FIG. 2 indicates that the driver analyzed in FIG. 2 wears his/her seatbelt 97% of the time, this particular seatbelt wearing element in the driver data 215 of FIG. 2 would have a score of 5 (very safe) based on the rubric above. These thresholds may be predetermined based on safety standards, or may be based on average driving behaviors. For example, the thresholds for the neutral score (3) could be based on a mean, the thresholds for the fairly safe score (4) and fairly risky score (2) could be based on one or more standard deviations away from the mean, and the thresholds for the very safe score (5) and very risky score (1) could be based on anything higher or lower than the other thresholds, respectively. In scales with more than 5 numbers, more intermediate thresholds could be set, for example one based on a single standard deviation from the mean, the next based on two standard deviations from the mean, the next based on three, and so on.

The equation 350 of FIG. 3B for the weighted average is very similar to the one above for the overall score. This time, the scores generated as described above for the individual elements in the driver data 215 of FIG. 2 are each multiplied by multipliers N and then summed together in the numerator, with the denominator including a sum of all of the multipliers N.

The particular equation 350 of FIG. 3B includes two individual elements in the driver data 215. Thus, the numerator includes a first driver element score 360 multiplied by a first multiplier $N_1$ 365 added to a second driver element score 370) multiplied by a second multiplier $N_2$ 375. The denominator includes the sum of the first multiplier $N_1$ 365 and the second multiplier $N_2$ 375.

Similar equations to the equation 350 may be used to calculate the vehicle score 240 of FIG. 2 (based on safety of individual elements of information about the vehicle) and the environment score 245 of FIG. 2 (safety of individual elements of information about an environment), though those are not illustrated here. As discussed above with respect to FIG. 2, the calculation of the driver score 235 may factor in individual elements of vehicle data 220 and/or environment data 225 where applicable to how safe the driver is. Likewise, the calculation of the vehicle score 240 may factor in individual elements of driver data 215 and/or environment data 225 where applicable to how safe the vehicle is. Likewise, the calculation of the environment score 245 may factor in individual elements of driver data 215 and/or vehicle data 220 where applicable to how safe the environment is.

Figure 4:
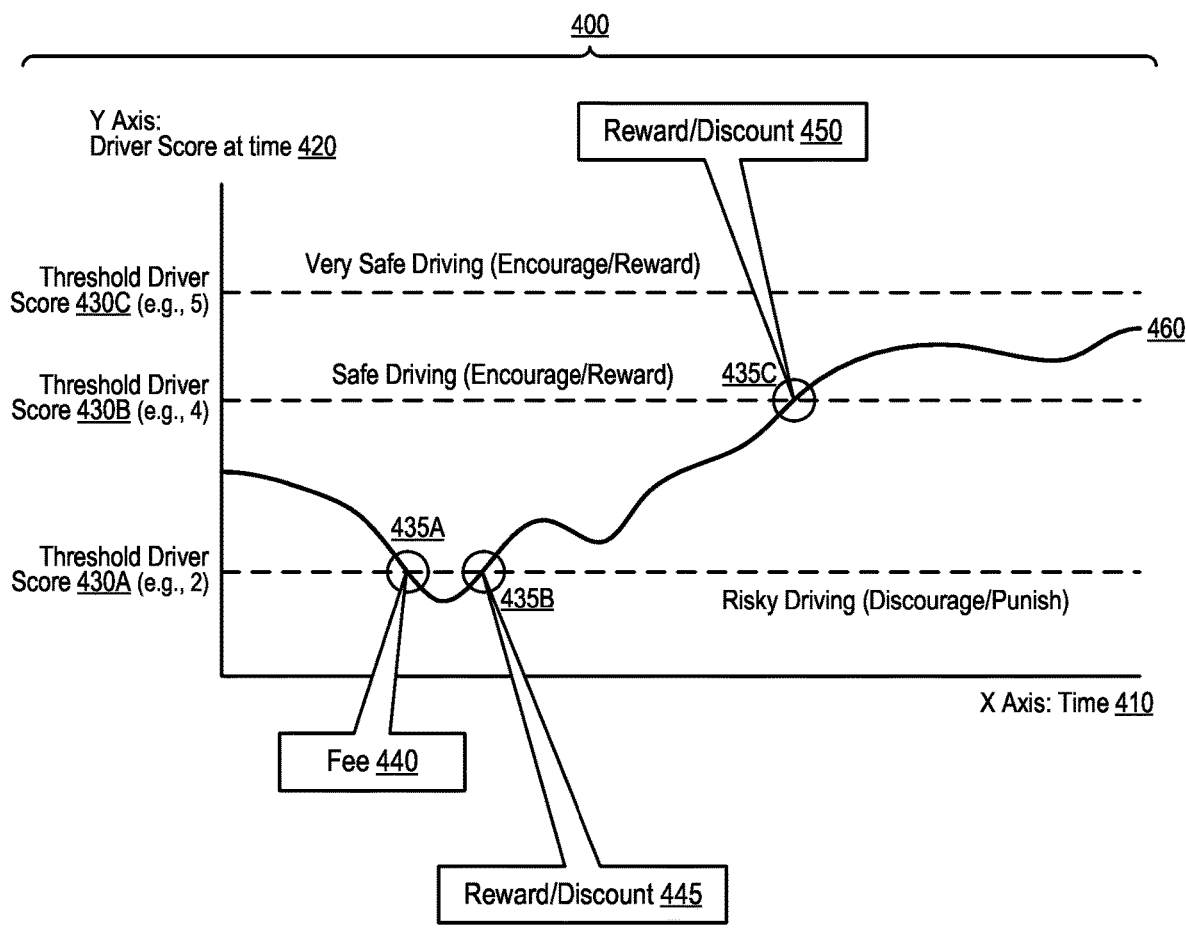
FIG. 4 is a graph illustrating a driver score over time, where different events are triggered as a result of the driver score crossing different threshold driver scores.

FIG. 4 is a graph illustrating a driver score over time, where different events are triggered as a result of the driver score crossing different threshold driver scores. The graph 400 of FIG. 4 is a graph with a line 460 representing the driver safety score 235 of a particular driver over a period of time. The horizontal X axis 410 represents time, while the vertical Y axis 420 represents driver safety scores 235. Following the line 460 allows one to read this particular driver's driver safety score 235 at any given time, calculated as described with respect to FIG. 2 and FIG. 3B.

The graph 400 of FIG. 4 includes three threshold driver safety score values—a first low threshold driver safety score value 430A (for example set to 2), a second higher threshold driver safety score value 430B (for example set to 4), and a third highest threshold driver safety score value 430C (for example set to 5). At a first point 435A, the line 460 falls below the first threshold 430A, indicating that the driver's driver safety score 235 has fallen into risky driving territory, which may trigger the driver being issued a punishment, such as a monetary fee or fine 440, or a rise in auto insurance premium. At a second point 435B, the line 460 rises back above the first threshold 430A, indicating that the driver's driver safety score 235 is no longer in risky driving territory, which may trigger the driver being issued a reward, such as a discount coupon 630 of FIG. 6. At a third point 435C, the line 460 rises above the second threshold 430B, indicating that the driver's driver safety score 235 of FIG. 2 has reached safe driving territory, which may trigger the driver being issued another reward, such as a discount coupon 630 of FIG. 6. The line 460 approaches but never quite rises above the third threshold 430C, but if it did, this might also trigger the driver being issued another reward, such as a discount coupon 630 of FIG. 6. These punishments and rewards incentivize better driving behavior by the driver. In cases where the rewards or punishments are tied to dynamic increases or decreases in auto or health insurance rates or premiums, this may allow safer drivers to pay less than riskier drivers due to generally lower risk of being involved in an automobile accident.

Similar graphs can also be generated graphing the various safety scores of FIG. 2 as they change overtime. As such the vehicle safety score 240, environment safety score 245, overall score 250, or combinations thereof may be displayed graphically and these graphs may identify rewards for rising to particular (higher/safer) thresholds and/or punishments for falling to other (lower/riskier) thresholds. Rather than incentivize better driver behavior, this may incentivize good upkeep and maintenance of a vehicle, choosing to drive in safer environments (safer areas at safer times of day and so forth).

In some cases, one or more of the threshold driver scores 430A/B/C of FIG. 4 may be based on data received regarding other drivers and/or vehicles than the driver and/or vehicle being scored. These other drivers and/or vehicles may be similar to the driver and/or vehicle being scored in that they are on the same roadway, in the same area, share similar driver demographics, drive similar vehicle types, or some combination thereof. Area, in this case, may be defined as a region within a predetermined radius around a driver and/or vehicle, one or more portions of one or more roads, one or more entire roads, one or more districts of one or more towns or cities, one or more entire towns or cities, one or more counties, one or more districts of one or more states, one or more states, one or more countries, one or more continents, or some combination thereof. Driver demographics may be based on sex, gender, age or age group, ethnicity, disability status, or some combination thereof. Vehicle types may be based on whether the vehicle is a boat, train, airplane, helicopter, sedan automobile, coupe automobile, sports utility vehicle automobile, truck automobile, semi-truck automobile, motorcycle, or another type of vehicle. Vehicle types may be based on number of axels, number of wheels, weight or weight class, or whether the vehicle has a certain component or capability, such as any component or capability discussed herein with respect to determining a vehicle score 240.

For instance, a threshold driver score may be based on an average driver score of the other drivers. In some cases, a threshold driver score may be based on such an average driver score plus or minus a multiplier multiplied by a standard deviation of the driver scores of the other drivers. The multiplier may be any number, such as 0, 0.5, 1, 1.5, 2, 2.5, 3, 3.5, 4, 4.5, 5, 5.5, 6, a number higher than 6, or any number in between any two of the listed numbers. Thus, for example, the first low threshold driver score value 430A of FIG. 4 may be generated to be two standard deviations below the average driver score of other drivers on the same roadway, in the same area, with similar demographics, and/or driving similar vehicles as the driver being scored. Similarly, the second higher threshold driver safety score value 430B may be one standard deviation above the average driver score of the other drivers, and the third highest threshold driver safety score value 430C may be two standard deviations above the average driver score of the other drivers. Threshold driver scores may also be based on minimum or maximum driver scores of other drivers on the same roadway, in the same area, with similar demographics, and/or driving similar vehicles as the driver being scored. The minimum or maximum driver scores of the other drivers may likewise be modified by adding or subtracting the multiplier multiplied by a standard deviation of the driver scores of the other drivers.

In certain instances, the scoring of a driver may be relative to data received regarding other drivers. For example, in snowy conditions received data may indicate that a driver of a first vehicle is driving faster that one or perhaps several other drivers that are driving other vehicles along the same roadway. The driver of the first vehicle may be assigned a lower driver safety score because he is driving faster than another driver or driver's driving along the same roadway. In such an instance, the driver of the first vehicle may be sent a message recommending that they drive slower because of the snowy conditions.

In certain instances, safety scores may be calculated based on relative speeds, relative following distances, or number of lane changes per unit time. Furthermore, these safety scores may be calculated based on data received from different classes of vehicles in a particular location. For example, the driver of a heavy truck may be assigned a lower score based on following distance behind a type of vehicle that has a shorter stopping distance than the heavy truck. In such instances messages may be sent to a computer at the heavy truck such that the driver of that truck may be advised to slow down or to increase a following distance.

Figure 5:
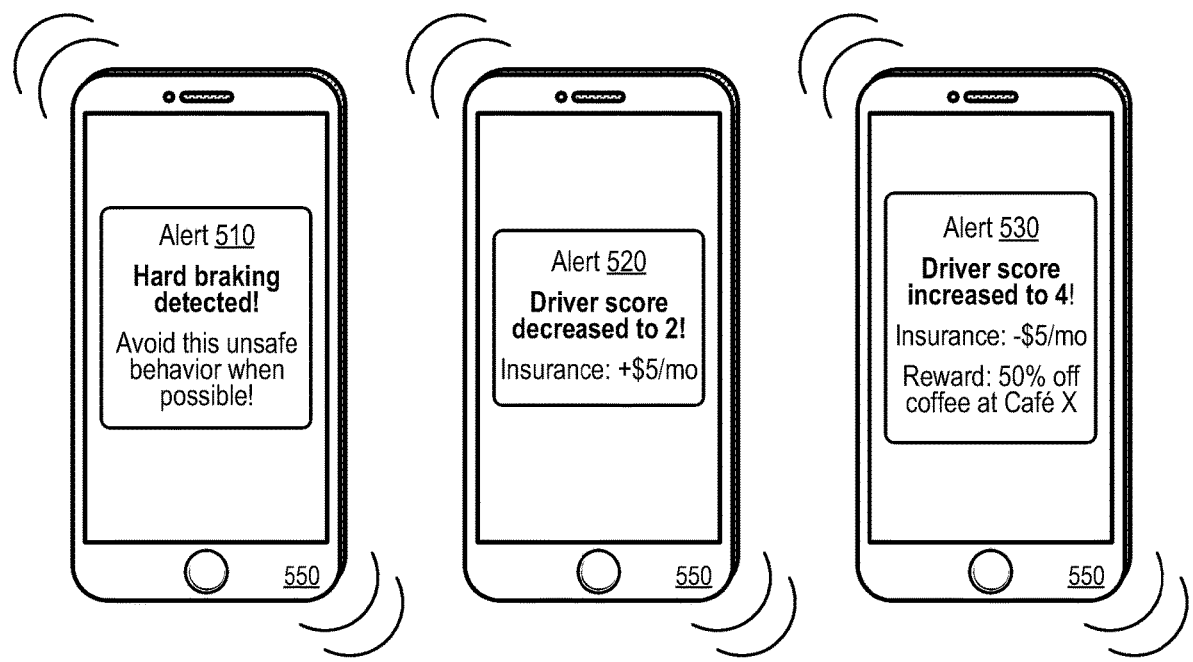
FIG. 5 illustrates alerts sent to a recipient device in response to vehicle behavior or to a driver score reaching a particular threshold.

FIG. 5 illustrates alerts sent to a recipient device in response to vehicle behavior or to a driver score reaching a particular threshold. FIG. 5 illustrates three different alert messages 510, 520, & 530 that may have been received by recipient device 550 of FIG. 5 over time. A first alert 510 of FIG. 5 indicates that an instance of hard braking has been detected, for example by accelerometers in the vehicle sensors 105. First alert 510 suggests that the driver avoid this unsafe behavior when possible to avoid risk of being rear ended in an accident. This first alert 510 may be directly tied to vehicle data 220 and/or driver data 215 of FIG. 2. It should be understood that similar alerts may be tied to driver data 215 of FIG. 2, for example an alert could advise that the driver and/or passengers in the vehicle should put on seatbelts. In certain instances, alerts may be generated based on environment data 225 of FIG. 2, for example alerting the driver to icy roads or suggesting that the driver avoid driving at night when possible because of severe weather or other conditions (e.g. fog, ice, snow, or rain).

A second alert 520 and third alert 530 of FIG. 5 are both based on the driver score 235 of FIG. 2 reaching particular thresholds, such as thresholds 430A-C of FIG. 4. The second alert 520 indicates that the driver score has decreased to 2, corresponding to the point 435A of FIG. 4, and indicates that as punishment, the driver's health and/or auto insurance premium will increase by $5 per month. The third alert 530 indicates that the driver score has increased to 4, corresponding to the point 435C of FIG. 4. Alert 530 indicates that as reward, the driver's health and/or auto insurance premium will decrease by $5 per month and that the driver will be given a coupon 630 for 50% off a coffee at Café X.

While the second alert 520 and third alert 530 of FIG. 5 are based on the driver score 235 rising or falling to particular threshold values, similar alerts may be output when the vehicle score 240 rises or falls to a particular value, when the environment score 245 rises or falls to a particular value, or when the overall score 250 rises or falls to a particular value. In certain instances, rewards provided to a particular driver may increase as a score for that particular driver crosses a particular threshold of a set of different thresholds. For example, a score reaching a first threshold level may result in a coupon for coffee and the score reaching a second threshold level may result in discounted insurance premium costs. In other instances, warnings or punishments provided to a driver may increase in severity as the driver's score reduces to a first threshold level and then to a second threshold level. For example, when the driver's score reduces to the first threshold level, the driver may be sent a message that warns the driver that he or she is driving unsafely and that unless the driver begins to drive more safely that their insurance premium will be increased. When the driver's score reduces to the second threshold level, the driver may be sent a message indicating that their insurance premium rate has been increased because of their continued unsafe driving.

While the alerts of FIG. 5 are illustrated as visual alert notification message boxes, it should be understood that these may alternately or additionally be output as audible speech messages (e.g., reading the same or similar text as shown in FIG. 5) or even particular sound effects such as beeps of different tones. Shifting to audio helps to avoid distracting the driver's visual focus.

Figure 6:
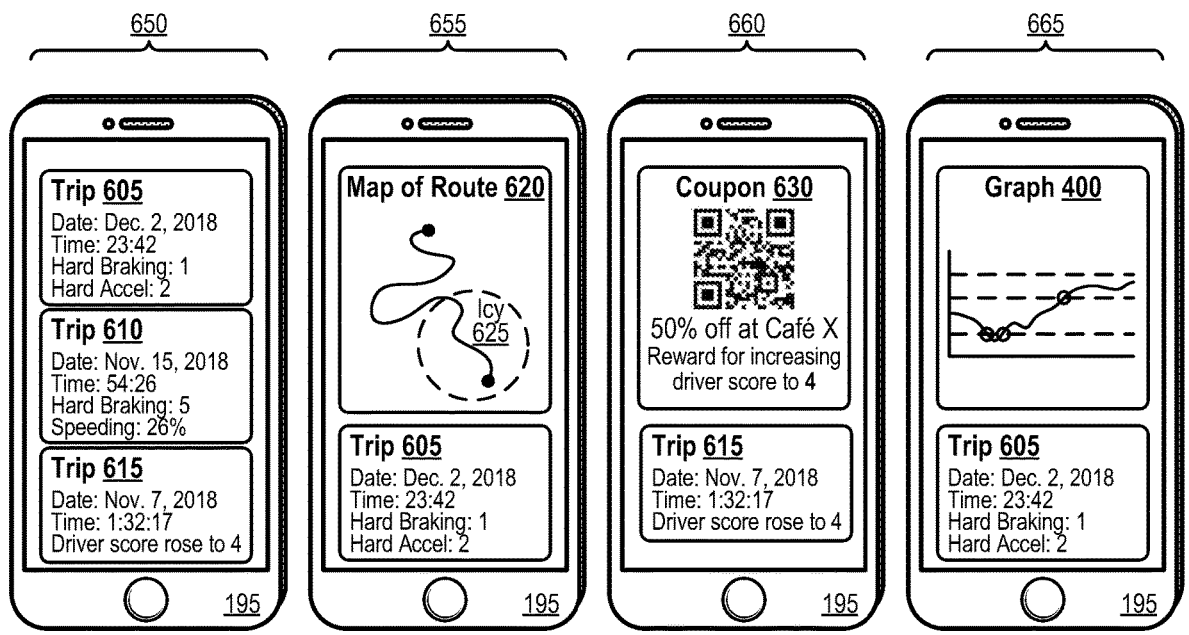
FIG. 6 illustrates interfaces for viewing different trips, maps, rewards, penalties, and scores.

FIG. 6 illustrates interfaces for viewing different trips, maps, rewards, penalties, and scores. The first interface 650 of FIG. 6 lists three trips: a first trip 605, a second trip 610, and a third trip 615. The first trip 605 was on Dec. 2, 2018, lasted 23 minutes and 42 seconds, and included one instance of hard braking and two instances of hard acceleration. The second trip 610 was on Nov. 15, 2018, lasted 54 minutes and 26 seconds, and included five instances of hard braking, and includes speeding for 26% of the route. The third trip 615 was on Nov. 7, 2018, lasted one hour and 32 minutes and 17 seconds, and the driver score rose to 4 on this trip. The interface 650 may include any other type of data discussed with respect to FIG. 1 or FIG. 2.

The second interface 655 of FIG. 6 includes the same information about the first trip 605 as in the first interface 650 of FIG. 6, and also includes a map 620 of the route taken during the first trip 605. This includes a start point and an endpoint, and includes a marked area of the map 625 where the road was icy.

The third interface 660 of FIG. 6 includes the same information about the third trip 615 as in the first interface 650 of FIG. 6, and also includes a coupon 630 for 50% off a coffee at Café X as a reward for the driver increasing his/her driver score 235 of FIGS. 2 to 4, which happened on the third trip 615.

The fourth interface 655 of FIG. 6 includes the same information about the first trip 605 as in the first interface 650 of FIG. 6, and also includes the graph 400 of FIG. 4.

FIG. 7 is a table illustrating collection of vehicle data that includes vehicles identification (VIN) numbers, odometer readings, dates, times, driver scores 235 of FIG. 2, vehicle scores 240 of FIG. 2, and environment scores 245 of FIG. 2. This is one example of data that may be stored in the secure databases 190 of FIG. 1—overall scores 250 may also be stored in each row, along with input data 210 used to generate any of these scores. Note that a first row of the table in FIG. 7 identifies a VIN of 1C6RD5KT7CS335395, an odometer reading of 84,685 miles, a date/time of Feb. 14, 2014-1905 Grenache Mean Time (GMT), a driver score of 3.2, a vehicle score of 2.3, and an environment score of 4.2. Note that other rows in the table of FIG. 7 identify similar information collected from different vehicles and/or generated from data received from different vehicles.

Figure 8:
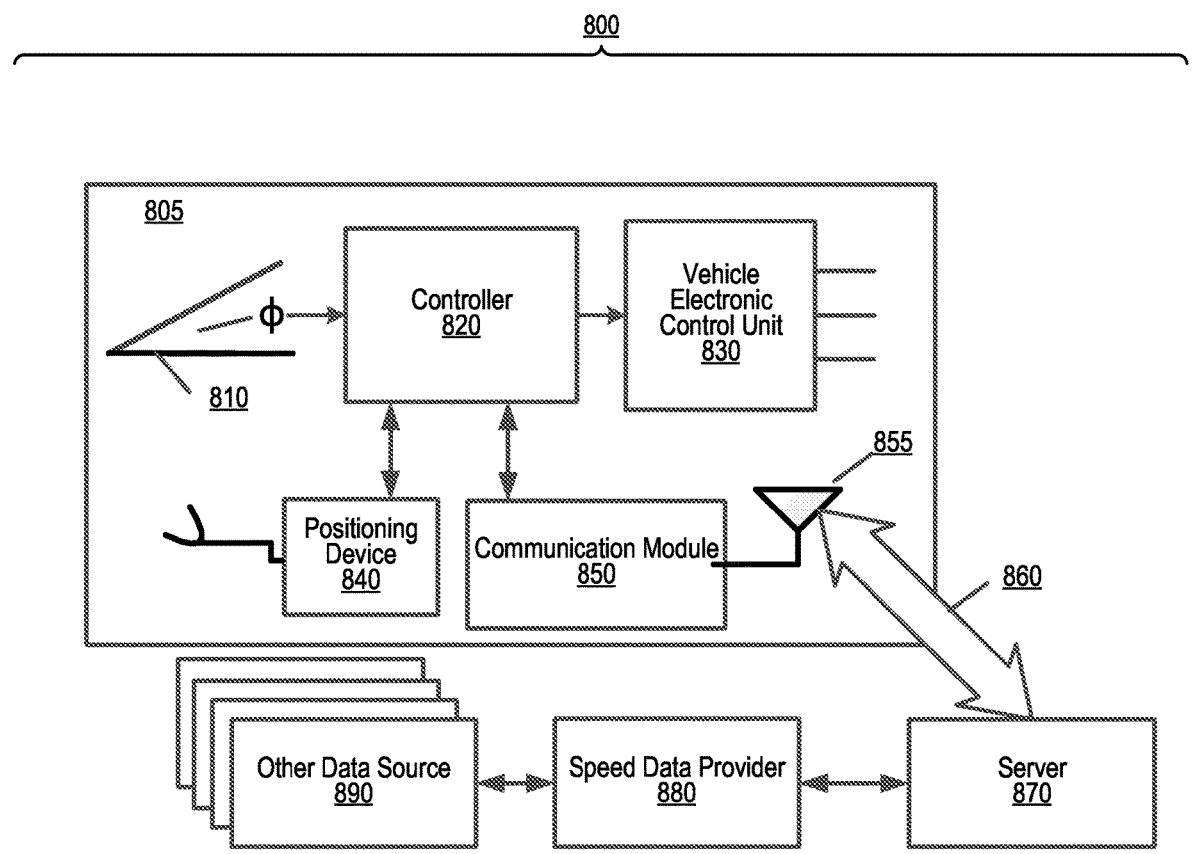
FIG. 8 illustrates a vehicle electronic control system.

FIG. 8 illustrates a vehicle electronic control system. The sub-system of FIG. 8 includes a vehicle accelerator (i.e. a throttle or gas pedal) 810, a controller 820, a vehicle electronic control unit (ECU) 830, the positioning device 840, and a communication module 850. When a driver depresses accelerator 810, a measure relating to how much the accelerator is depressed may be sensed by controller 820. The measure of accelerator depression may correspond to an angle like $\phi$ of FIG. 8. As such, $\phi$ may correspond to a measure of resistance when accelerator 810 is coupled to a rheostat (not depicted).

The positioning device 115 may receive satellite information via antenna 845 and communicate that information to controller 820. In such an instance, positioning device 115 may provide information (such as longitude and latitude data) that identifies a current location of the vehicle to controller 820. Controller 820 may then transmit that location information via communication module 850 and communication antenna 855 to an external computing device. Communication module 850 may be implemented via any type of communication technology discussed with respect to the input devices 1060 and/or output devices 1070 of FIG. 10, including yet not limited to wireless cellular (2G, 3G, 4G, or other) communications, radio communications, or other communication technology.

In certain instances, the information provided to an external computing device via communication module 850 and antenna 855 may be pushed (i.e. proactively sent to) to the external computing device or be pulled by the external computing device (i.e. sent in response to a ping or to a message that was sent from the external computing device). The information sent to the external computing device may also include a GNSS location that corresponds to a speed limit or to a replacement maximum speed of particular locations.

Figure 9:
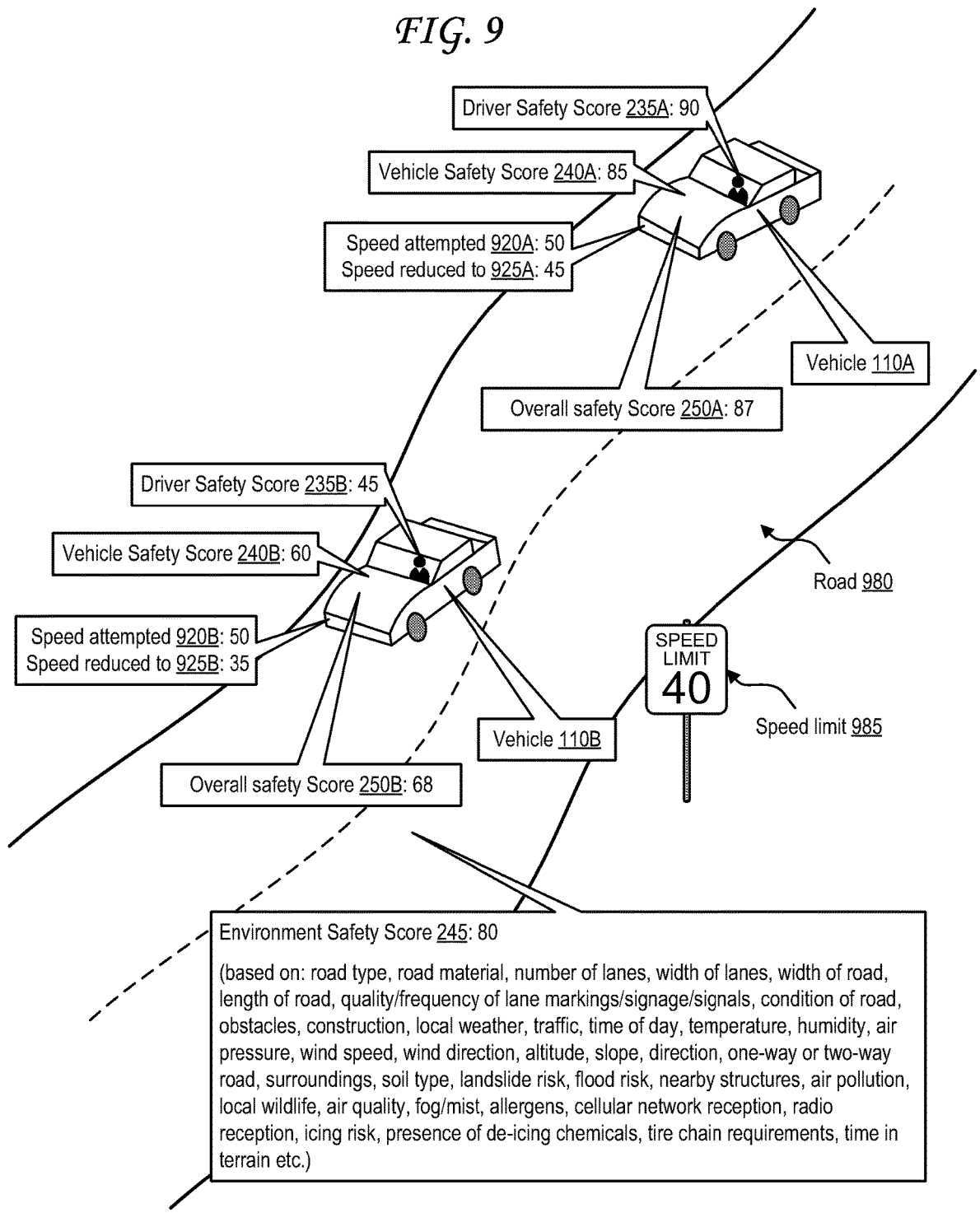
FIG. 9 illustrates application of driver, vehicle, and environmental safety/risk assessments on drive enhancement systems such as vehicle speed limiting systems.

Information may also be received from an external computing device via antenna 855 and communication module 850 that may identify a speed limit along a roadway or a replacement maximum speed, such as the personalized/customized speed thresholds/limits discussed with respect to FIG. 9. The information received from the external apparatus may be passed to controller 820 where controller 820 may compare current GNSS location information with the received maximum speed information as controller 820 controls the maximum speed of the vehicle as the vehicle travels down a roadway. This information may be referred to as a control signal and also identify any of the other personalized/customized thresholds/limits discussed with respect to FIG. 9, such as the limits on acceleration, braking, turning, or honking.

When controller 820 identifies that a maximum speed of the vehicle should be changed, controller 820 may provide information to ECU 830 that limits the maximum speed of the vehicle, where ECU 830 controls the speed of the vehicle using vehicle control outputs 835. As such, vehicle control outputs 835 may be coupled to an engine, electric motor, or other apparatus that may limit the speed of the vehicle. In certain instances, controller 820 can limit the speed of the vehicle by directly providing speed control to an engine, an electric motor, or other apparatus. Controller 820 may, thus, bypass ECU 830 when limiting the speed of the vehicle. Acceleration controls operate similarly, and may for example provide a limit or threshold on revolutions per minute of an engine of the vehicle, or even on maximum angle or amount to which the accelerator 810 is permitted to be depressed by the driver.

While the maximum speed of a vehicle may be limited by controller 820 intercepting accelerator position and by providing substituted accelerator position data to ECU 830, the present disclosure is not limited to this technique. Alternatively, the speed of a vehicle may be controlled via other means, including, yet not limited to: applying controlled braking or dynamic braking (electronic vehicles), by controlling the pulse with of a pulse width modulation signal that provides power to electrical motors, by controlling fuel as it is delivered to an engine, or by other means.

The system 800 of FIG. 8 may include sub-system 805 that resides within a vehicle, such as the telemetric devices discussed herein. Controller 820 may receive location information from positioning device 115 and may provide that location information to an external computing device, such as a remote server 870 that is a computing device 1400 as discussed in FIG. 14, via communication module 850 and communication antenna 855. Note that FIG. 8 also illustrates a wireless signal 860 that communicates information to external server 870. External server 870 may periodically ping a vehicle control sub-system of a vehicle for location information. In such instances, server 870 may send a communication that requests (i.e. that "pings") that vehicle control sub-system 805 send location information to the server 870. Server 870 may also send some or all of this information received from vehicle control sub-system 805 to speed data provider 880 for analysis. Note that server 870 may ping vehicle control subsystem 805 periodically (i.e. every 80 seconds, for example). The server 870 may be used for calculation of any of the safety scores discussed herein (e.g. driver score 235, vehicle score 240, environment score 245, overall score 250), any personalized or customized thresholds or limits as discussed with respect to FIG. 4 or FIG. 9. The server 870 may include one or more servers and may include any of the positioning servers 140, network server 150, or application servers 155 of FIG. 1, and/or additional servers not illustrated in FIG. 1.

Server 870 may receive GNSS data from sub-system 805 via wireless signal 860, and server 870 may communicate this GNSS data to speed data provider 880. Speed data provider 880 may also receive data from one or more other sources 890. In certain instances, speed data provider 880 may track a route along which a vehicle is traveling. Speed data provider 880 may then provide information to server 870 that relates to the route along which the vehicle is traveling. The information provided by the speed data provider 880 may include information that identifies: a speed limit at a location, a maximum speed setting that corresponds to the location, or may include other information that is pertinent to limiting the maximum speed of the vehicle as it travels along the route. Server 870 may also forward the information provided by speed data provider 880 to subsystem 805 such that controller 820 may control the maximum speed of the vehicle according to the information provided by speed data provider 880.

Speed data provider 880 may retrieve or be provided data from other data sources 890 when preparing information to send to server 870. Sources of this other data include, yet are not limited to electronic devices that are directly connected to roadway infrastructure (such as signal lights) and services that post roadway information. These other data sources 890 of FIG. 8 may be a system that collects information related to a roadway or be a system that provides weather information regarding an area around the roadway. As such, data collected from other sources 890 may include information relating to an accident, information related to road hazards, or information related to weather conditions. The other sources 890 may include environmental data sources 170, road-based data sources 180, and/or vehicle sensors 105. In certain instances, server 870 or speed data provider 880 may provide information relating to real-time information that limits the speed of the vehicle along a roadway based on current road conditions. For example, when server 870 or speed data provider 880 identifies that it is raining along a certain section of roadway where a vehicle is traveling, information may be sent to communication module 850 such that controller 820 may limit the speed of the vehicle to 45 MPH, for example. In yet other instances, the speed of a vehicle may be limited to speeds stored in memory at sub-system 805.

In certain instances, the functions of server 870 and speed data provider 880 discussed herein may be implemented by different computing devices that communicate with each other over a data communication interface. In yet other instances, the functions of server 870 and speed data provider 880 may be implemented in a single computing system. As such, server 870 and speed data provider 880 may reside in different physical locations or may be co-located at a single physical location. In certain instances, speed data provider 880 and server 870 may communicate with each other over the internet.

While data may be transmitted from a vehicle control sub-system periodically, data may also be transmitted from a vehicle control sub-system whenever the vehicle control sub-system has detected a change in the route being driven. A change in route may, for example, be identified when a vehicle turns more than a threshold number of degrees off a particular route. Alternatively or additionally, a change of route may be identified when a vehicle turns onto another roadway. In certain instances data may be transmitted from a vehicle when an anomalous condition has been observed. Alternatively or additionally data may be transmitted from a vehicle when an event is detected. For example, when a vehicle stops moving or when the vehicle is involved in an accident a vehicle control sub-system may send a message to an external electronic device.

Since transmissions to server 870 may not (always) be periodic, server 870 or speed data provider 880 may also use timing information when the speed of a vehicle is controlled. In one instance, controller 820 may transmit a relative or absolute time via communication module 850, antenna 855, and signal 860 when location information is transmitted from sub-system 805 to server 870, and server 870 may also transmit this time based information when vehicle location information is transmitted to speed data provider 880. In such instances, speed data provider 880 could calculate or identify measures of vehicle speed by evaluating relative changes in vehicle location and changes in time between different relative locations.

FIG. 9 illustrates application of driver, vehicle, and environmental safety/risk assessments on drive enhancement systems such as vehicle speed limiting systems.

In particular, FIG. 9 illustrates two vehicles—a first vehicle 110A and a second vehicle 110B—that are each driven by two different drivers along a single road 980 for which a posted speed limit 985 is 40 miles per hour (mph). The first vehicle 110A is attempting to drive at a speed 920A of 50 miles per hour, and vehicle control systems (such as those illustrated in FIG. 8) in the first vehicle 110A reduce this attempted speed 920A to a reduced speed 925A of 45 miles per hour. The second vehicle 110B is attempting to drive at a speed 920B of 50 miles per hour, and vehicle control systems (such as those illustrated in FIG. 8) in the second vehicle 110B reduce this attempted speed 920B to a reduced speed 925B of 35 miles per hour. The determination as to how much to reduce the speed for either vehicle can be based on the attempted speed 920, a speed limit 985 applicable on the thoroughfare that the vehicle is on, a driver safety score 235A/235B of the driver, a vehicle safety score 240A/240B of the vehicle, an environmental safety score 245 of the environment that the vehicle is driving in, an overall safety score 250A/250B that combines at least two of the driver score 235A & 235B and/or vehicle score 240A & 240B and/or environment score 245 of FIG. 2. Optionally as discussed in respect to FIG. 3A & FIG. 4 overall scores may be calculated based on some combination of collected data or calculated driver, vehicle, and/or environment scores.

Note that the scores of FIG. 9 use a 0-100 scale instead of the 1-5 scale illustrated in FIG. 2, FIG. 4, FIG. 5, and FIG. 6. In FIG. 9, the 0-100 scale is represented as such: 100 is very safe and 0 is very unsafe. An overall safety score 250A assigned to the first vehicle 110A and the first driver along this road 980 is 87 out of 100. This relatively high overall safety score 250A indicates that, overall, there is a relatively low risk associated with this first driver driving the first vehicle 110A along the road 980. When possible, the overall safety score 250A is calculated using the driver safety score 235A, the vehicle safety score 240A, and the environment safety score 245. Here, the first driver has a driver safety score 235A of 90 out of 100, meaning that the first driver is generally a safe driver. The vehicle safety score 240A of the first vehicle 110A is 85 out of 100, meaning that the first vehicle 110A is in relatively good condition and is relatively safe to drive. The environment safety score 245, as above, is 80 out of 100, which indicates that the environment is relatively safe to drive in.

An overall safety score 250B assigned to the second vehicle 110B and the second driver along this road 980 is 68 out of 100. This mediocre overall safety score 250A indicates that, overall, the risk of this second driver driving the second vehicle 110B along the road 980 is higher than the risk of the first driver driving the first vehicle 110A along the road 980. As discussed above, the overall safety score 250B is generally calculated using the driver safety score 235B, the vehicle safety score 240B, and the environment safety score 245. Here, the second driver has a driver safety score 235B of 45 out of 100, suggesting that the second driver is generally not a very safe driver. The vehicle safety score 240A of the second vehicle 110B is 60 out of 100, meaning that the second vehicle 110B is in relatively mediocre condition and is not particularly safe to drive. The environment safety score 245 is 80 out of 100 as above.

The overall safety score 250A, which corresponds to the first vehicle 110A and/or its driver and/or the environment that the first vehicle 110A is driving in, is higher than the overall safety score 250B, which corresponds to the second vehicle 110B and/or its driver and/or the environment that the second vehicle 110B is driving in. As a result, even though both vehicles have an attempted speed 920 of 50 miles per hour, the first vehicle 110A has a reduced speed 925A of 45 miles per hour, while the second vehicle 110B has a reduced speed 925B of 35 miles per hour. The reduced speed 925 of any vehicle may be a static numeric limit, or may vary depending on the attempted speed 420 of the vehicle and/or speed limit 985 and/or any changes to the driver score 235, vehicle score 240, environment score 245, or overall score 250.

The driver safety score 235 may be based on anything discussed with respect to the input data 210 of FIG. 2 or the various data sources of FIG. 1, or any of the following: driver health, driver age, number of years of experience as a driver, scores or grades awarded to the driver for each of one or more paper-based and/or behind-the-wheel-style driving tests, recent sensor measurement(s) of driver heartbeat, recent sensor measurement(s) of driver pulse, recent sensor measurement(s) of driver blood oxygen level, recent sensor measurement(s) of driver glucose level, recent sensor measurement(s) of driver perspiration level, recent sensor measurement(s) of driver body temperature, recent sensor measurement(s) of blood alcohol content, whether or not the vehicle identifies that the driver is wearing a seatbelt, whether or not the vehicle identifies that each of one or more passengers is wearing a seatbelt, duration of time that the driver has been driving without a rest break, number of vehicle-related accidents that the driver has been involved in, how recent one or more vehicle-related accidents that the driver was involved in were, whether the driver was found to be at fault in one or more vehicle-related accidents that the driver was involved in, reported eyesight quality of the driver, whether or not the driver is wearing glasses, whether or not the driver is wearing contact lenses, whether or not the driver is wearing sunglasses, one or more reported illnesses of the driver, one or more reported medical conditions of the driver, one or more reported disabilities of the driver, one or more reported medications that the driver is currently using, one or more reported medications that the driver is uses on a regular basis, an age of the driver, an age range into which the driver's age falls into, a gender or sex of the driver, a race or ethnicity or national origin of the driver, one or more camera-based and computer-vision-based determinations of whether the driver's eyes appear to be focused on the road or distracted and focused elsewhere, whether any driving data reported by the driver is suspected to be fraudulent, any other indication of driver safety or risk discussed herein, or combinations thereof.

The vehicle safety score 240A or 240B may be based on anything discussed with respect to the input data 210 of FIG. 2 or the various data sources of FIG. 1, or any of the following: mileage of the vehicle, age of the vehicle, number of owners of the vehicle over time, number of drivers of the vehicle over time, number of accidents that the vehicle has been in, number of repairs made on the vehicle, quantity of fuel remaining in each of one or more fuel storage tanks of the vehicle, type of fuel used by the vehicle (e.g., diesel, leaded gasoline/petrol, unleaded gasoline/petrol, ethanol, hydrogen, natural gas, propane, butane, kerosene, liquefied petroleum gas, electricity, biodiesel, methanol, p-series fuels, or hybrids/combinations thereof), damage incurred by the vehicle, modifications performed to the vehicle, weight being carried by the vehicle, class of vehicle, type of vehicle (e.g., boat, train, airplane, helicopter, sedan automobile, coupe automobile, sports utility vehicle automobile, truck automobile, semi-truck automobile, motorcycle), brand of vehicle, manufacturer of vehicle, distributor of vehicle, purchase date of vehicle, number of component recalls in the vehicle, presence or lack of airbags, presence or lack of heating, presence or lack of air conditioning, presence or lack of fans, tire pressure, quantity of oil, battery charge level of each of one or more batteries, presence or lack of tire chains, presence or lack of four-wheel-drive (4WD) capability by the vehicle, presence or lack of all-wheel-drive (AWD) capability by the vehicle, presence or lack of anti-lock brakes, quality and/or age and/or condition of the brakes, quality and/or age and/or condition of tires and/or tire treads, presence or lack of seat belts, any other indication of vehicle safety or risk discussed herein, whether the vehicle has autonomous driving capabilities, safety record of the vehicle's autonomous driving capabilities, level of driving autonomy, whether the vehicle has autonomous parking capabilities, safety record of the vehicle's autonomous parking capabilities, or combinations thereof.

Level of driving autonomy generally falls into a level from 0 to 5. Level 0 autonomy indicates that the vehicle is not autonomous at all, and the driver has full control. Level 5 autonomy indicates that the vehicle is fully autonomous and never requires driver input. Levels 1-4 are levels of driving autonomy in between level 0 and level 5. Level 1 autonomy indicates that most functions are still controlled by the driver, but a specific function—such as steering or accelerating—can be done automatically by the car. Level 2 autonomy indicates that aspects of steering and acceleration/deceleration are autonomous, as in cruise control and lane-centering, allowing drivers to take their hands off of the steering wheel and their foot off of the gas pedal simultaneously—but must always be ready to take control of the vehicle. Level 3 autonomy indicates that the vehicle is mostly autonomous but that the driver may be required to intervene under certain traffic or environmental conditions. Level 4 autonomy indicates that the vehicle is fully autonomous and is designed to perform perfectly for a full trip, but is not designed for certain driving scenarios or environments (e.g., dirt roads, off-roading). Level 5 autonomy indicates that the vehicle is fully autonomous and expected to perform equivalently to a human in every possible driving scenario. Overreliance on autonomous vehicles can cause drivers to fall out of practice and become poorer in everyday driving scenarios. Also, while a level 4 or level 5 vehicle might be safer than a human driver in certain situations (depending on the autonomous vehicle control system's safety record), Level 2 autonomy or Level 3 autonomy may actually pose a greater degree of risk than even Level 0, as drivers are likely to take their eyes off of the road and stop paying attention despite the incomplete degree of autonomy and occasional requirement that human drivers intervene.

The environment safety score 245 may be based on anything discussed with respect to the input data 210 of FIG. 2 or the various data sources of FIG. 1, or any of the following: road type, road material, number of lanes, width of lanes, width of road, length of road, quality/frequency of lane markings/signage/signals, condition of road, obstacles, construction, local weather, traffic, time of day, temperature, humidity, air pressure, wind speed, wind direction, altitude, slope, direction, one-way or two-way road, surroundings, soil type, landslide risk, flood risk, nearby structures, air pollution, local wildlife, air quality, fog/mist, allergens, cellular network reception, radio reception, icing risk, presence of de-icing chemicals, tire chain requirements, time in terrain, any other indication of environment-based safety or risk discussed herein, or combinations thereof.

Road type is important as a bridge with steep drops on either side is generally inherently more risky to drive along than a freeway going through a relatively planar countryside. Furthermore, as "road" is used broadly here to refer to various types of thoroughfares, a train track is generally a safer type of "road" than a road for automobiles, as trains generally do not have to watch out for other vehicular traffic or pedestrians except at intersections of train tracks with other train tracks or automobile roads or other types of thoroughfares. Road material is important in that dirt roads or gravel roads are typically less safe and more risky than asphalt roads due to decreased traction. Number of lanes and is important, as more lanes can more easily permit passing, but can also cause issues due to dangerous weaving drivers. Width of lanes and width of the road in general is important, as wider lanes are more forgiving of slight unintended movements by vehicles, and therefore safer and less risky to drive along. Width of the road is important, as wider roads are more forgiving and give more room to maneuver along inherently risky terrain such as mountains or bridges. Length of the road (both length between stops and length overall) is important, as drivers going along a long road without any rest areas or stops may experience fatigue and endanger everyone on the road as a result. Length of the road is important, as drivers going along a long road without any rest areas or stops may experience fatigue and endanger everyone on the road as a result.

Quality and/or frequency of lane markings, signage, and road/traffic signals is important, as roads with faded or nonexistent lane markings are riskier and less safe than roads with fresh lane markings, and intersections without stop signs or traffic signals (or with defective/incorrect signs or traffic signals) are less safe than roads/intersections with more correct signage and working road/traffic signals. The condition of road is important, as roads with potholes and cracks are less safe than roads without such wear. Obstacles such as stopped cars, accident wreckage, pedestrians (e.g., along a road that runs near a school or shopping mall), or stray tree branches likewise make roads less safe. Construction is important, as roads/lanes can often be unexpectedly closed off or rerouted due to traffic, increasing risk by putting drivers on unfamiliar or unusual routes, and because construction can cause hazards and obstacles such as construction crew personnel, or flying rocks, dirt, dust, or sparks that can affect a vehicle.

Local weather is important, as unusual weather can affect safety and risk negatively. Precipitation such as rain, snow, sleet, or hail can decrease driving safety by obscuring or potentially damaging windshields and by depositing substances (snow, water, ice, hail) on the road that decrease vehicles' traction with the road. Other aerial phenomena, such as fog, mist, heavy winds, dust, tornadoes, whirlwinds, dust devils, can likewise obscure driving visibility or push/pull vehicles in directions that the driver is not directing the vehicle depending on wind speed and wind direction. Local traffic is important as well, as a road suffering bumper-to-bumper traffic is riskier to drive along than a road with little to no other vehicles along it. Time of day is important, as drivers driving late at night generally have lower visibility of their surroundings and are generally more fatigued and therefore drive less safely. At the same time, drivers driving at or near local sunset or local sunrise times are likely to experience sunlight shining in their eyes, which may similarly reduce visibility. Effects such as temperature, humidity, altitude, and air pressure may affect vehicle performance and may contribute to driver fatigue, potentially making a drive less safe. Slope, or road grade, is important in that a steep road (e.g., 20% grade or above) is riskier than a relatively flat one (e.g., 10% grade or below). Road direction can be important in combination with other factors such as slope, to determine if the road travels uphill or downhill, or wind direction, to determine whether the wind is pushing/pulling vehicles toward an unsafe direction, such as toward a cliff. Whether the road is a one-way road or a two-way road may also impact safety, as driving along one-way roads carries a lower risk of head-on collisions between vehicles.

Surroundings, landmarks, and nearby structures are important, in that a road near or along a cliff edge is riskier to drive along than a road in a relatively planar area, and a road alongside a hazardous waste facility or a school with many nearby pedestrians might be riskier to drive along than a road surrounded by fields of grass. Soil type and landslide risk are important, as softer soil or high landslide risk can increase the risk of the road collapsing, or the surroundings collapsing onto the road and any vehicles on it. Earthquake risk and flood risk are important in that areas prone to such disasters are less safe to drive in. Local wildlife, such as deer, can also serve as unexpected moving obstacles for drivers to avoid, and represent risk. Air pollution, air quality, bad smells, and allergens can sometimes increase risk by damaging vehicles, distracting drivers, or causing drivers to drive quickly to escape affected areas. Icing risk, tire chain requirements, and presence of de-icing chemicals are important in that icy roads have little traction and are therefore dangerous. Poor cellular network reception or radio reception can also represent a distraction for drivers who might be tempted to fiddle with radios or cellular devices that have stopped working properly. Icing risk can cause slippery and dangerous roads, a risk which may be mitigated by presence of de-icing chemicals such as salt on the road. If there is a tire chain requirement for a particular stretch of road, that generally indicates that that stretch of road is at risk of being very snowy and/or icy and may have steep terrain as well, which may indicate risk particularly if the vehicle at issue does not have tire chains applied and/or does not have 4WD or AWD capabilities. Time in a particular terrain or environment type may also be an issue, as extended periods of time in very cold or very hot or very wet conditions, for example, might cause vehicle components of some vehicles to expand, contract, freeze, melt, rust, deform, or otherwise undergo a modification that results in these components not functioning as they original would or as they are intended to function, thereby providing extra risk.

While FIG. 9 illustrates generation of speed thresholds or limits that are personalized or customized to the driver and/or to the vehicle and/or to the environment—that is, the "speed reduced to" 925 values—other types of personalized or customized thresholds or limits can also be generated. For instance, personalized or customized thresholds or limits can be generated for acceleration, deceleration, turning radius, brake strength, duration of horn usage, frequency of horn usage, duration of high-beam usage, frequency of high-beam usage, or combinations thereof. Like for speed, these may be personalized or customized to the driver and/or to the vehicle and/or to the environment. For example, an extremely aggressive driver with a low driver safety score 235 might be prevented from accelerating too sharply or honking too often or for too long. A vehicle with a low vehicle safety score 240 might similarly be prevented from accelerating too hard or turning too sharply to avoid further damage to the vehicle. A vehicle driving in a risky area with a low environment safety score 245, such as along a cliff side, might also be prevented from accelerating too hard. Similarly, a vehicle driving in heavy traffic might be prevented from accelerating too hard, honking too frequently/long, or using its high beams too frequently/long.

FIG. 10 illustrates an exemplary computing system 1000 that may be used to implement some aspects of the subject technology. For example, any of the computing devices, computing systems, network devices, network systems, servers, and/or arrangements of circuitry described herein may include at least one computing system 1000, or may include at least one component of the computer system 1000 identified in FIG. 10. The computing system 1000 of FIG. 10 includes one or more processors 1010 and memory 1020. Each of the processor(s) 1010 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1010 may include one or more cores, either integrated onto a single chip or spread across multiple chips connected or coupled together. Memory 1020 stores, in part, instructions and data for execution by processor 1010. Memory 1020 can store the executable code when in operation. The system 1000 of FIG. 10 further includes a mass storage device 1030, portable storage medium drive(s) 1040, output devices 1050, user input devices 1060, a graphics display 1070, peripheral devices 1080, and a network interface 1095.

The components shown in FIG. 10 are depicted as being connected via a single bus 1090. However, the components may be connected through one or more data transport means. For example, processor unit 1010 and memory 1020 may be connected via a local microprocessor bus, and the mass storage device 1030, peripheral device(s) 1080, portable storage device 1040, and display system 1070 may be connected via one or more input/output (I/O) buses. Alternatively or additionally, the various components in FIG. 10 may communicate using wireless communications.

Mass storage device 1030, which may be implemented with a magnetic disk drive or an optical disk drive, is a non-volatile storage device for storing data and instructions for use by processor unit 1010. Mass storage device 1030 can store the system software for implementing some aspects of the subject technology for purposes of loading that software into memory 1020.

Portable storage device 1040 operates in conjunction with a portable non-volatile storage medium, such as a floppy disk, compact disk or Digital video disc, to input and output data and code to and from the computer system 1000 of FIG. 10. The system software for implementing aspects of the subject technology may be stored on such a portable medium and input to the computer system 1000 via the portable storage device 1040.

The memory 1020, mass storage device 1030, or portable storage 1040 may in some cases store sensitive information, such as transaction information, health information, or cryptographic keys, and may in some cases encrypt or decrypt such information with the aid of the processor 1010. The memory 1020, mass storage device 1030, or portable storage 1040 may in some cases store, at least in part, instructions, executable code, or other data for execution or processing by the processor 1010.

Output devices 1050 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1070. The printer may be inkjet, laserjet, thermal, or some combination thereof. In some cases, the output device circuitry 1050 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 1050 may include any ports, plugs, antennae, wired or wireless transmitters, wired or wireless transceivers, or any other components necessary for or usable to implement the communication types listed above, such as cellular Subscriber Identity Module (SIM) cards.

Input devices 1060 may include circuitry providing a portion of a user interface. Input devices 1060 may include an alpha-numeric keypad, such as a keyboard, for inputting alpha-numeric and other information, or a pointing device, such as a mouse, a trackball, stylus, or cursor direction keys. Input devices 1060 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 1060 may include any ports, plugs, antennae, wired or wireless receivers, wired or wireless transceivers, or any other components necessary for or usable to implement the communication types listed above, such as cellular SIM cards.

Input devices 1060 may include receivers or transceivers used for positioning of the computing system 1000 as well. These may include any of the wired or wireless signal receivers or transceivers. For example, a location of the computing system 1000 can be determined based on signal strength of signals as received at the computing system 1000 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1000 such as a router, modem, switch, hub, bridge, gateway, or repeater. These may also include Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1060 may include receivers or transceivers corresponding to one or more of these GNSS systems.

Display system 1070 may include a liquid crystal display (LCD), a plasma display, an organic light-emitting diode (OLED) display, an electronic ink or "e-paper" display, a projector-based display, a holographic display, or another suitable display device. Display system 1070 receives textual and graphical information, and processes the information for output to the display device. The display system 1070 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1080 may include any type of computer support device to add additional functionality to the computer system. For example, peripheral device(s) 1080 may include one or more additional output devices of any of the types discussed with respect to output device 1050, one or more additional input devices of any of the types discussed with respect to input device 1060, one or more additional display systems of any of the types discussed with respect to display system 1070, one or more memories or mass storage devices or portable storage devices of any of the types discussed with respect to memory 1020 or mass storage 1030 or portable storage 1040, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTER-CARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

Network interface 1095 may be any form of communication interface known in the art that allows computer system 1000 to receive data from or send data to other computers. As such, the network interface 1095 may be wired or wireless interface or include both wired and wireless communication capabilities. Some network interfaces included in a computer of a vehicle may be an interface that communicates over a cellular network, a radio network, or a satellite network.

The components contained in the computer system 1000 of FIG. 10 can include those typically found in computer systems that may be suitable for use with some aspects of the subject technology and represent a broad category of such computer components that are well known in the art. That said, the computer system 1000 of FIG. 10 can be customized and specialized for the purposes discussed herein and to carry out the various operations discussed herein, with specialized hardware components, specialized arrangements of hardware components, and/or specialized software. Thus, the computer system 1000 of FIG. 10 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1000 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1000 may also use a Basic Input/Output System (BIOS) or Unified Extensible Firmware Interface (UEFI) as a layer upon which the operating system(s) are run.

In some cases, the computer system 1000 may be part of a multi-computer system that uses multiple computer systems 1000, each for one or more specific tasks or purposes. For example, the multi-computer system may include multiple computer systems 1000 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1000 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1020, the mass storage 1030, the portable storage 1040, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L10), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1010 for execution. A bus 1090 carries the data to system RAM or another memory 1020, from which a processor 1010 retrieves and executes the instructions. The instructions received by system RAM or another memory 1020 can optionally be stored on a fixed disk (mass storage device 1030/portable storage 1040) either before or after execution by processor 1010. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1000 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for vehicle control, the method comprising:
   receiving, from a computing device associated with a vehicle operated by a driver, kinematic data captured using at least one sensor of the vehicle, the kinematic data characterizing movement of the vehicle over a first time period associated with the driver operating the vehicle;
   generating an overall safety score as a weighted average of a driver score, a vehicle score, and an environment score, wherein the driver score is based on at least one aspect of the kinematic data that are indicative of driving behaviors by the driver, wherein the vehicle score is based on at least one aspect of the kinematic data that are indicative of operation of the vehicle, wherein the environment score is based on information about an environment that the vehicle is in, and wherein the weighted average is weighted based on at least one multiplier;
   identifying a speed threshold based on a comparison between the overall safety score and a score threshold;
   identifying, based on the kinematic data, a first speed of the vehicle;
   identifying that the first speed of the vehicle exceeds the speed threshold; and
   sending a command to the vehicle to cause an automatic speed reduction in the vehicle from the first speed to a second speed that is lower than the first speed, wherein an amount of the automatic speed reduction is based on the speed threshold.

2. The method of claim 1, further comprising:
   updating the environment score based on updated global navigation satellite system (GNSS) information received over a second time period to generate an updated environment score, wherein the overall safety score is lowered based on the updated environment score being lower than the environment score; and sending an updated command to the vehicle to cause a second automatic speed reduction in the vehicle from the second speed to a third speed that is lower than the second speed.

3. The method of claim 1, further comprising:
updating the driver score based on additional kinematic data received over a second time period to generate an updated driver score, wherein the overall safety score is lowered based on the updated driver score being lower than the driver score; and
sending an updated command to the vehicle to cause a second automatic speed reduction in the vehicle from the second speed to a third speed that is lower than the second speed.

4. The method of claim 3, wherein the driver data indicates that the driver is not wearing a seatbelt.

5. The method of claim 1, further comprising:
updating the vehicle score based on vehicle data received over a second time period to generate an updated vehicle score, wherein the overall safety score is lowered based on the updated vehicle score being lower than the vehicle score; and
sending an updated command to the vehicle to cause a second automatic speed reduction in the vehicle from the second speed to a third speed that is lower than the second speed.

6. The method of claim 1, wherein, based on the at least one multiplier, the driver score is weighted more heavily in the weighted average than the environment score and than the vehicle score.

7. The method of claim 1, further comprising:
setting a multiplier of a plurality of multipliers to zero for calculating the weighted average, wherein the at least one multiplier includes the plurality of multipliers, wherein the multiplier is associated with at least one of the environment score, the driver score, or the vehicle score.

8. An apparatus for vehicle control, the apparatus comprising:
a memory storing instructions; and
a processor that executes the instructions to:
receive, from a computing device associated with a vehicle operated by a driver, kinematic data captured using at least one sensor of the vehicle, the kinematic data characterizing movement of the vehicle over a first time period associated with the driver operating the vehicle;
generate an overall safety score as a weighted average of a driver score, a vehicle score, and an environment score, wherein the driver score is based on at least one aspect of the kinematic data that are indicative of driving behaviors by the driver, wherein the vehicle score is based on at least one aspect of the kinematic data that are indicative of operation of the vehicle, wherein the environment score is based on information about an environment that the vehicle is in, and wherein the weighted average is weighted based on at least one multiplier;
identify a speed threshold based on a comparison between the overall safety score and a score threshold;
identify, based on the kinematic data, a first speed of the vehicle;
identify that the first speed of the vehicle exceeds the speed threshold; and
send a command to the vehicle to cause an automatic speed reduction in the vehicle from the first speed to a second speed that is lower than the first speed, wherein an amount of the automatic speed reduction is based on the speed threshold.

9. The apparatus of claim 8, where the processor also executes instructions to:
updating the environment score based on updated global navigation satellite system (GNSS) information received over a second time period to generate an updated environment score, wherein the overall safety score is lowered based on the updated environment score being lower than the environment score; and
sending an updated command to the vehicle to cause a second automatic speed reduction in the vehicle from the second speed to a third speed that is lower than the second speed.

10. The apparatus of claim 8, where the processor also executes instructions to:
updating the driver score based on additional kinematic data received over a second time period to generate an updated driver score, wherein the overall safety score is lowered based on the updated driver score being lower than the driver score; and
sending an updated command to the vehicle to cause a second automatic speed reduction in the vehicle from the second speed to a third speed that is lower than the second speed.

11. The apparatus of claim 10, wherein the driver data indicates that the driver is not wearing a seatbelt.

12. The apparatus of claim 8, where the processor also executes instructions to:
updating the vehicle score based on vehicle data received over a second time period to generate an updated vehicle score, wherein the overall safety score is lowered based on the updated vehicle score being lower than the vehicle score; and
sending an updated command to the vehicle to cause a second automatic speed reduction in the vehicle from the second speed to a third speed that is lower than the second speed.

13. The apparatus of claim 8, wherein, based on the at least one multiplier, the driver score is weighted more heavily in the weighted average than the environment score and than the vehicle score.

14. The apparatus of claim 8, further comprising:
setting a multiplier of a plurality of multipliers to zero for calculating the weighted average, wherein the at least one multiplier includes the plurality of multipliers, wherein the multiplier is associated with at least one of the environment score, the driver score, or the vehicle score.

15. A non-transitory computer-readable storage medium having embodied thereon a program executable by a processor for implementing a method for vehicle control, the method comprising:
receiving, from a computing device associated with a vehicle operated by a driver, kinematic data captured using at least one sensor of the vehicle, the kinematic data characterizing movement of the vehicle over a first time period associated with the driver operating the vehicle;
generating an overall safety score as a weighted average of a driver score, a vehicle score, and an environment score, wherein the driver score is based on at least one aspect of the kinematic data that are indicative of driving behaviors by the driver, wherein the vehicle score is based on at least one aspect of the kinematic data that are indicative of operation of the vehicle, wherein the environment score is based on information about an environment that the vehicle is in, and wherein the weighted average is weighted based on at least one multiplier;

identifying a speed threshold based on a comparison between the overall safety score and a score threshold;

identifying, based on the kinematic data, a first speed of the vehicle;

identifying that the first speed of the vehicle exceeds the speed threshold; and sending a command to the vehicle to cause an automatic speed reduction in the vehicle from the first speed to a second speed that is lower than the first speed, wherein an amount of the automatic speed reduction is based on the speed threshold.

16. The non-transitory computer-readable storage medium of claim 15, the method further comprising:

updating the environment score based on updated global navigation satellite system (GNSS) information received over a second time period to generate an updated environment score, wherein the overall safety score is lowered based on the updated environment score being lower than the environment score; and sending an updated command to the vehicle to cause a second automatic speed reduction in the vehicle from the second speed to a third speed that is lower than the second speed.

17. The non-transitory computer-readable storage medium of claim 15, the method further comprising:

updating the driver score based on additional kinematic data received over a second time period to generate an updated driver score, wherein the overall safety score is lowered based on the updated driver score being lower than the driver score; and sending an updated command to the vehicle to cause a second automatic speed reduction in the vehicle from the second speed to a third speed that is lower than the second speed.

18. The non-transitory computer-readable storage medium of claim 17, wherein the driver data indicates that the driver is not wearing a seatbelt.

19. The non-transitory computer-readable storage medium of claim 15, the method further comprising:

updating the vehicle score based on vehicle data received over a second time period to generate an updated vehicle score, wherein the overall safety score is lowered based on the updated vehicle score being lower than the vehicle score; and sending an updated command to the vehicle to cause a second automatic speed reduction in the vehicle from the second speed to a third speed that is lower than the second speed.

20. The non-transitory computer-readable storage medium of claim 15, wherein, based on the at least one multiplier, the driver score is weighted more heavily in the weighted average than the environment score and than the vehicle score.

* * * * *